US009608972B2

(12) United States Patent
Takeuchi

(10) Patent No.: US 9,608,972 B2
(45) Date of Patent: Mar. 28, 2017

(54) SERVICE PROVIDING SYSTEM AND DATA PROVIDING METHOD THAT CONVERT A PROCESS TARGET DATA INTO OUTPUT DATA WITH A DATA FORMAT THAT A SERVICE RECEIVING APPARATUS IS ABLE TO OUTPUT

(71) Applicant: Sachiko Takeuchi, Tokyo (JP)

(72) Inventor: Sachiko Takeuchi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 79 days.

(21) Appl. No.: 14/338,551

(22) Filed: Jul. 23, 2014

(65) Prior Publication Data
US 2015/0040188 A1 Feb. 5, 2015

(30) Foreign Application Priority Data

Jul. 30, 2013 (JP) .................................. 2013-157478
Jul. 18, 2014 (JP) .................................. 2014-147438

(51) Int. Cl.
H04L 29/06 (2006.01)
H04L 29/08 (2006.01)

(52) U.S. Cl.
CPC .......... H04L 63/08 (2013.01); H04L 63/0876 (2013.01); H04L 67/2823 (2013.01)

(58) Field of Classification Search
CPC ..... H04L 63/08; H04L 63/0876; H04L 67/16; H04L 63/10; H04L 63/00
USPC ............................................................ 726/3
See application file for complete search history.

(56) References Cited

U.S. PATENT DOCUMENTS

2002/0013870 A1* 1/2002 Aoki ....................... H04L 29/06 710/36
2002/0029199 A1* 3/2002 Go .......................... H04L 63/04 705/51
2002/0062397 A1* 5/2002 Chang ................... G06F 3/1204 709/246

(Continued)

FOREIGN PATENT DOCUMENTS

JP 2002-055913 2/2002
JP 2005-251179 9/2005
JP 2013-073358 4/2013

*Primary Examiner* — William Goodchild
(74) *Attorney, Agent, or Firm* — IPUSA, PLLC

(57) ABSTRACT

A system providing a service to a service receiving apparatus includes a management information storage that stores management information including service identification information, user authentication information of a user, and device authentication information of the service receiving apparatus that are associated with each other; an authentication information receiving unit that receives, as authentication information, at least one of user authentication information and device authentication information from the service receiving apparatus; an authentication unit that performs authentication by referring to the management information storage based on the received authentication information; an obtaining unit that obtains process target data from an external service based on an entry request from the service receiving apparatus that has been successfully authenticated; and a conversion unit that converts the obtained process target data into output data with a data format that the service receiving apparatus is able to output.

9 Claims, 19 Drawing Sheets

(56) References Cited

U.S. PATENT DOCUMENTS

2005/0220035 A1* 10/2005 Ling .................. H04L 41/5012
370/252
2007/0101143 A1* 5/2007 Iwata .................... G06F 3/0608
713/172
2013/0081146 A1 3/2013 Hakozaki

* cited by examiner

FIG.4

| LICENSE TYPE | ID | REGISTRATION CODE | REGISTRATION STATUS |
|---|---|---|---|
| TENANT | 10000 | AAA | REGISTERED |
| TENANT | 10001 | AAB | REGISTERED |
| TENANT | 10002 | AAC | NON-REGISTERED |
| PRINT SERVICE | 20000 | – | REGISTERED |
| PRINT SERVICE | 20001 | – | REGISTERED |
| PRINT SERVICE | 20002 | – | NON-REGISTERED |
| DELIVERY SERVICE | 30000 | – | REGISTERED |
| DELIVERY SERVICE | 30001 | – | REGISTERED |
| DELIVERY SERVICE | 30002 | – | NON-REGISTERED |
| ... | ... | ... | ... |

FIG.5

| TENANT ID | NAME | SERVICE ID | SERVICE TYPE | PERIOD OF VALIDITY | EXTERNAL SERVICE | EXTERNAL SERVICE | ADDRESS INFORMATION | UTILIZATION AREA INFORMATION |
|---|---|---|---|---|---|---|---|---|
| 10000 | COMPANY A | 20000 | PRINT SERVICE | 1 YEAR | ONLINE STORAGE A | ONLINE STORAGE B | A@aaa.com | JAPAN |
|  |  | 20001 | PRINT SERVICE | 1 YEAR |  |  |  |  |
|  |  | 30000 | DELIVERY SERVICE | 1 YEAR |  |  |  |  |
| 10001 | COMPANY B | 30001 | DELIVERY SERVICE | 1 YEAR | ONLINE STORAGE A | — | A@bbb.com | USA |
| ... | ... | ... | ... | ... | ... | ... | ... | ... |

FIG.6

| TENANT ID | LOGIN | | INTERNAL AUTHENTICATION | ONLINE STORAGE A | | | ONLINE STORAGE B | | | ADDRESS INFORMATION |
|---|---|---|---|---|---|---|---|---|---|---|
| | USER ID | PASSWORD | USER ID | ACCOUNT | PASSWORD | ACCOUNT | AUTHORIZATION TOKEN | SCOPE | | |
| 10000 | YAMADA | 123 | Yamada | YYamada | 1234 | yamada | aaaaa | aa, bb | A@aaa.com | ... |
| | SATOH | 456 | SatohY | Sato | 4567 | sato | bbbbb | aa | B@aaa.com | |
| | SUZUKI | 789 | SuzukiK | SUZUKI | 7890 | Suzuki | ccccc | bb, cc | C@aaa.com | |
| 10001 | SUZUKI | 111 | — | TSuzuki | 1111 | — | — | — | A@bbb.com | |
| | SASAKI | 222 | — | SASAKI | 222 | — | — | — | D@bbb.com | |
| ... | ... | ... | ... | ... | ... | ... | ... | ... | ... | ... |

FIG.7

| TENANT ID | APPARATUS ID | SERVICE ID | SERVICE TYPE | STARTING DATE | EXPIRATION DATE | |
|---|---|---|---|---|---|---|
| 10000 | 1 | 20000 | PRINT SERVICE | 2012/1/1 | 2012/12/31 | |
| | | 30000 | DELIVERY SERVICE | 2012/6/1 | 2013/5/31 | |
| | 2 | 20001 | PRINT SERVICE | 2012/6/1 | 2013/5/31 | |
| 10001 | 3 | 30001 | DELIVERY SERVICE | 2013/1/1 | 2013/12/31 | |
| ... | ... | ... | ... | ... | ... | ... |

FIG.8

| EXTERNAL SERVICE ID | SERVICE NAME | CLIENT ID | CLIENT SECRET | PRODUCT NAME | SCOPE | AUTHORIZATION URL | REDIRECTION URL |
|---|---|---|---|---|---|---|---|
| 001 | ONLINE STORAGE A | | | | | | |
| 002 | ONLINE STORAGE B | ABCDE | XXXXX | Servece | aa | http://www.001.com/auth | http://www.XXX.com/callback |
| | | | | | bb | | |
| | | | | | cc | | |
| ... | ... | ... | ... | ... | ... | ... | ... |

# SERVICE PROVIDING SYSTEM AND DATA PROVIDING METHOD THAT CONVERT A PROCESS TARGET DATA INTO OUTPUT DATA WITH A DATA FORMAT THAT A SERVICE RECEIVING APPARATUS IS ABLE TO OUTPUT

CROSS-REFERENCE TO RELATED APPLICATIONS

The present application is based upon and claims the benefit of priority of Japanese Patent Application No. 2013-157478 filed on Jul. 30, 2013 and Japanese Patent Application No. 2014-147438 filed on Jul. 18, 2014, the entire contents of which are incorporated herein by reference.

BACKGROUND OF THE INVENTION

1. Field of the Invention

An aspect of this disclosure relates to a service providing system and a data providing method.

2. Description of the Related Art

There exist control systems, control apparatuses, and control programs that enable information processing apparatuses such as printers to use electronic data stored in a storage service on a network for various purposes (see, for example, Japanese Laid-Open Patent Publication No. 2013-73358).

A related-art data conversion-output function for converting electronic data received from an external service into output data such as print data and outputting the output data is intended for use in a network of a private environment such as an office environment.

Accordingly, unlike the provision of services by, for example, a cloud environment, the data conversion-output function is not intended to control the provision of a service depending on recipients of the service such as users, organizations, and companies.

Thus, with the related-art data conversion-output function, it is difficult to control the provision of a service depending on recipients of the service. The provision of a service by a cloud environment is an example of a service providing method or technology.

SUMMARY OF THE INVENTION

In an aspect of this disclosure, there is provided a system implemented by one or more information processing apparatuses and providing a service to a service receiving apparatus connected via a network to the system. The system includes a management information storage that stores management information including service identification information of the service, user authentication information of a user using the service, and device authentication information of the service receiving apparatus that are associated with each other; an authentication information receiving unit that receives, as authentication information, at least one of user authentication information used for user authentication and device authentication information used for device authentication from the service receiving apparatus; an authentication unit that performs authentication by referring to the management information storage based on the received authentication information; an obtaining unit that obtains process target data from an external service based on an entry request from the service receiving apparatus that has been successfully authenticated; and a conversion unit that converts the obtained process target data into output data with a data format that the service receiving apparatus is able to output.

BRIEF DESCRIPTION OF THE DRAWINGS

FIG. 4 is a table illustrating exemplary license information;

FIG. 5 is a table illustrating exemplary tenant information;

FIG. 6 is a table illustrating exemplary user information;

FIG. 7 is a table illustrating exemplary apparatus information;

FIG. 8 is a table illustrating exemplary external service information;

DESCRIPTION OF THE PREFERRED EMBODIMENTS

Preferred embodiments of the present invention are described below with reference to the accompanying drawings.

<<System Configuration>>

Figure 1:
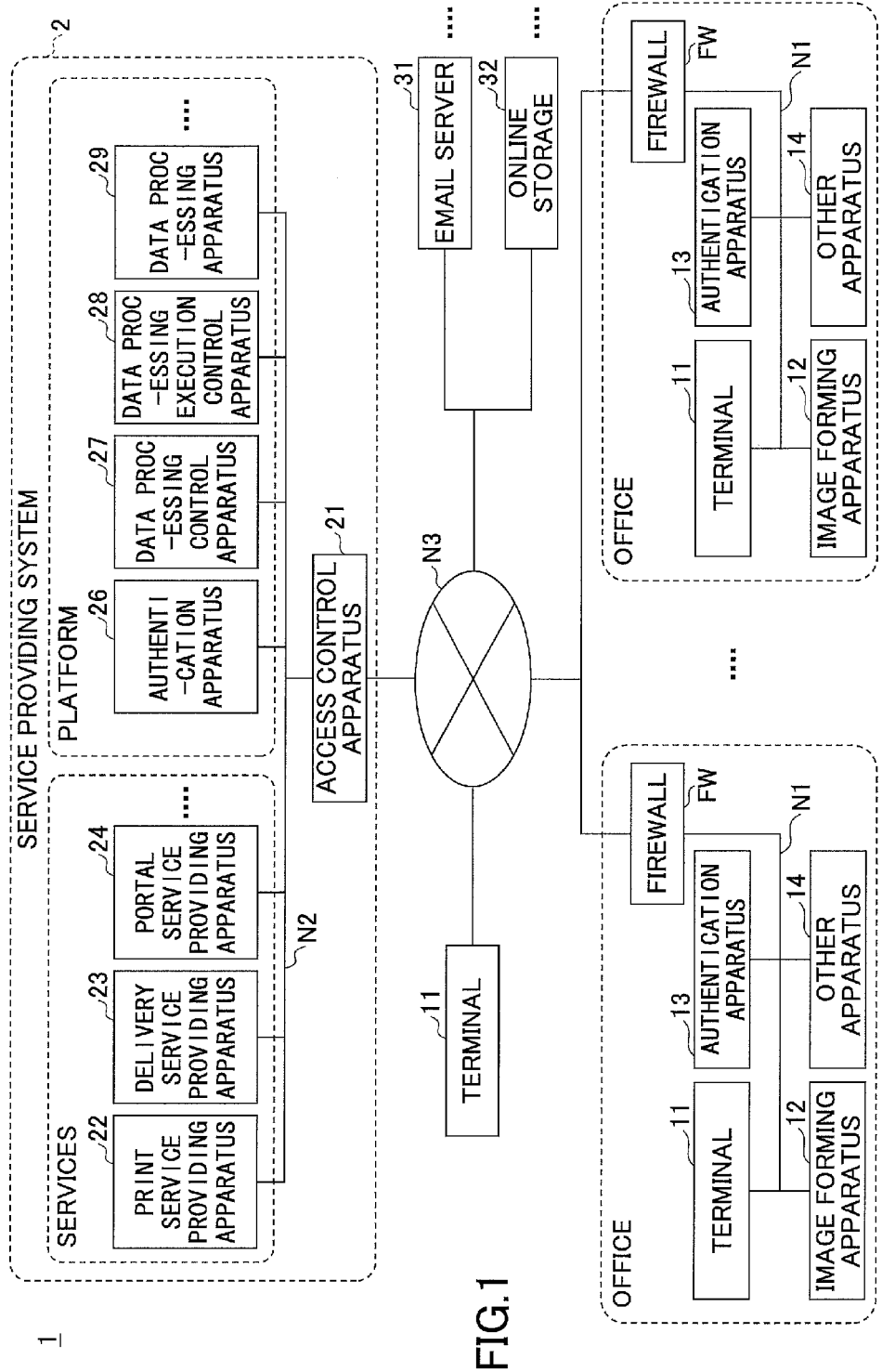
FIG. 1 is a drawing illustrating an exemplary configuration of an information processing system.

FIG. 1 is a drawing illustrating an exemplary configuration of an information processing system 1 according to an embodiment. As illustrated by FIG. 1, the information processing system 1 may include a private network(s) N1 in an office(s) (hereafter referred to as an "office network N1"), a network N2 of a service providing system 2 such as a cloud service, and a network N3 such as the Internet. The networks N1 through N3 are examples of network environments.

A firewall FW is provided on the office network N1. The firewall FW limits accesses from unauthorized sources. An access control apparatus 21 is provided on the network N2 of the service providing system 2. The access control apparatus 21 limits accesses via the network N3.

The office network N1 is a private network behind the firewall FW. A terminal 11, an image forming apparatus 12, an authentication apparatus 13, and another apparatus 14 may be connected to the office network N1.

The terminal 11 may be implemented, for example, by an information processing apparatus (or a computer system) where a general-purpose operating system (OS) is installed. Examples of the terminal 11 include a personal computer (PC), a tablet PC, a notebook PC, a smartphone, and a cell phone that a user can operate.

The image processing apparatus 12 may be implemented by any apparatus such as a multifunction peripheral, a copier, a scanner, or a laser printer that includes an image forming function. The authentication apparatus 13 may be implemented, for example, by an information processing apparatus where a general-purpose operating system (OS) is installed. The authentication apparatus 13 provides a user authentication function. The other apparatus 14 may be any other apparatus such as a projector or an electronic blackboard.

Each of the terminal 11, the image forming apparatus 12, the authentication apparatus 13, and the other apparatus 14 includes a wireless communication unit and/or a wired communication unit. In the example of FIG. 1, one terminal 11, one image forming apparatus 12, one authentication apparatus 13, and one other apparatus 14 are connected to the office network N1. However, two or more of each type of apparatus may be connected to the office network N1.

The service providing system 2 may be constructed by, for example, a provider that provides a cloud service via the network N3. Although a cloud service is used as an example in the present embodiment, the present embodiment may also be applied to any other type of service such as a service of an application service provider (ASP) or a Web service that is provided via the network N3.

The network N2 of the service providing system 2 is connected via the access control apparatus 21 to the network N3. The access control apparatus 21, a print service providing apparatus 22, a delivery service providing apparatus 23, a portal service providing apparatus 24, an authentication apparatus 26, a data processing control apparatus 27, a data processing execution control apparatus 28, and a data processing apparatus 29 may be connected to the network N2.

Details of the print service providing apparatus 22, the delivery service providing apparatus 23, the portal service providing apparatus 24, the authentication apparatus 26, the data processing control apparatus 27, the data processing execution control apparatus 28, and the data processing apparatus 29 are described later.

The access control apparatus 21, the print service providing apparatus 22, the delivery service providing apparatus 23, the portal service providing apparatus 24, the authentication apparatus 26, the data processing control apparatus 27, the data processing execution control apparatus 28, and the data processing apparatus 29 of the service providing system 2 may be implemented by one or more information processing apparatuses (or computers). That is, functions of the apparatuses of the service providing system 2 may be concentrated on one information processing apparatus or distributed to multiple information processing apparatuses. The number of information processing apparatuses to implement the apparatuses of the service providing system 2 is not limited to any value.

Also, some or all of the apparatuses of the service providing system 2 may be provided in a private network such as the office network N1. The configuration of the information processing system 1 is not limited to the example described above. For example, the present invention is not limited to a configuration where the firewall FW is provided between the service providing system 2 and the apparatuses of the office network N1 that access the service providing system 2.

The apparatuses constituting the service providing system 2 may be roughly classified into two types: service providing apparatuses including service providing functions for providing services, and platform apparatuses including platform functions that are commonly used to provide the services.

The print service providing apparatus 22, the delivery service providing apparatus 23, and the portal service providing apparatus 24 are examples of service providing apparatuses including service providing functions for providing services. The authentication apparatus 26, the data processing control apparatus 27, the data processing execution control apparatus 28, and the data processing apparatus 29 are examples of platform apparatuses including platform functions that are commonly used to provide services.

The above classification of the apparatuses of the service providing system 2 is for descriptive purposes and is not intended to limit the present invention.

A terminal 11, an email server(s) 31, and an online storage(s) 32 may be connected to the network N3 such as the Internet. Thus, one or more terminals 11 may be connected to the office network N1 and/or the network N3. In the example of FIG. 1, one terminal 11 is connected to the office network N1 in the office and one terminal 11 is connected to the network N3 such as the Internet.

The email server 31 performs processes related to email such as transmission and reception of email messages of users. The online storage 32 performs processes related to a service to rent storage areas. The email server 31 and the online storage 32 may be implemented by one or more information processing apparatuses.

<<Hardware Configuration>>

Figure 2:
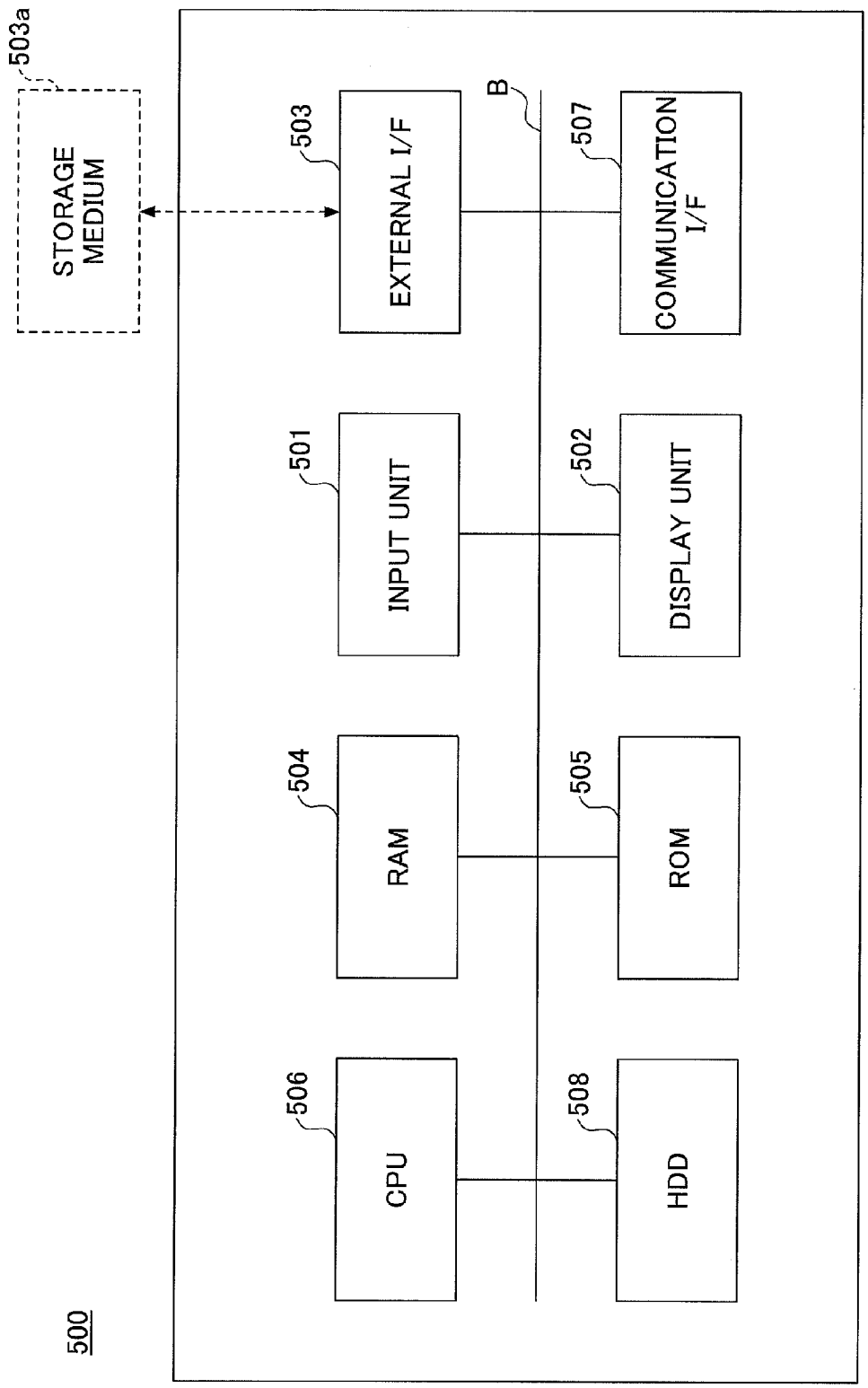
FIG. 2 is a block diagram illustrating an exemplary hardware configuration of a computer system.

Each of the terminal 11 and the authentication apparatus 13 of FIG. 1 may be implemented by a computer system with a hardware configuration as illustrated by FIG. 2. Similarly, each of the access control apparatus 21, the print service providing apparatus 22, the delivery service providing apparatus 23, the portal service providing apparatus 24, the authentication apparatus 26, the data processing control apparatus 27, the data processing execution control apparatus 28, and the data processing apparatus 29 of the service providing system 2 of FIG. 1 may be implemented by a computer system with a hardware configuration as illustrated by FIG. 2. Also, each of the email server 31 and the online storage 32 of FIG. 1 may be implemented by a computer system with a hardware configuration as illustrated by FIG. 2. FIG. 2 is a block diagram illustrating an exemplary hardware configuration of a computer system 500 according to the present embodiment.

As illustrated by FIG. 2, the computer system 500 may include an input unit 501, a display unit 502, an external I/F 503, a random access memory (RAM) 504, a read-only memory (ROM) 505, a central processing unit (CPU) 506, a communication I/F 507, and a hard disk drive (HDD) 508 that are connected to each other via a bus B.

The input unit 501 includes, for example, a keyboard, a mouse, and a touch panel, and is used by a user to input instructions (or operation signals) to the computer system 500. The display unit 502 displays, for example, processing results of the computer system 500.

The communication I/F 507 is an interface for connecting the computer system 500 to one or more of the networks N1 through N3. The computer system 500 can perform data communications via the communication I/F 507.

The HDD 508 is a non-volatile storage device for storing various programs and data. For example, the HDD 508 may store basic software or an operating system (OS) for controlling the entire computer system 500, and application software for providing various functions on the OS.

The external I/F 503 is an interface between the computer system 500 and an external storage such as a storage medium 503a. The computer system 500 can read and write data from and to the storage medium 503a via the external I/F 503. Examples of the storage medium 503a include a flexible disk, a compact disk (CD), a digital versatile disk (DVD), a secure digital (SD) memory card, and a universal serial bus (USB) memory.

The ROM 505 is a non-volatile semiconductor memory (storage unit) that can retain programs and data even when power is turned off. For example, the ROM 505 stores programs and data such as a basic input/output system (BIOS) that is executed when the computer system 500 is turned on, and OS and network settings of the computer system 500. The RAM 504 is a volatile semiconductor memory (storage unit) for temporarily storing programs and data.

The CPU (processor) 506 loads programs and data from storage units (e.g., the ROM 505 and the HDD 508) into the RAM 504 and executes the loaded programs to control the computer system 500 and to implement various functions of the computer system 500.

<<Software Configuration>>
<Service Providing System>

Figure 3:
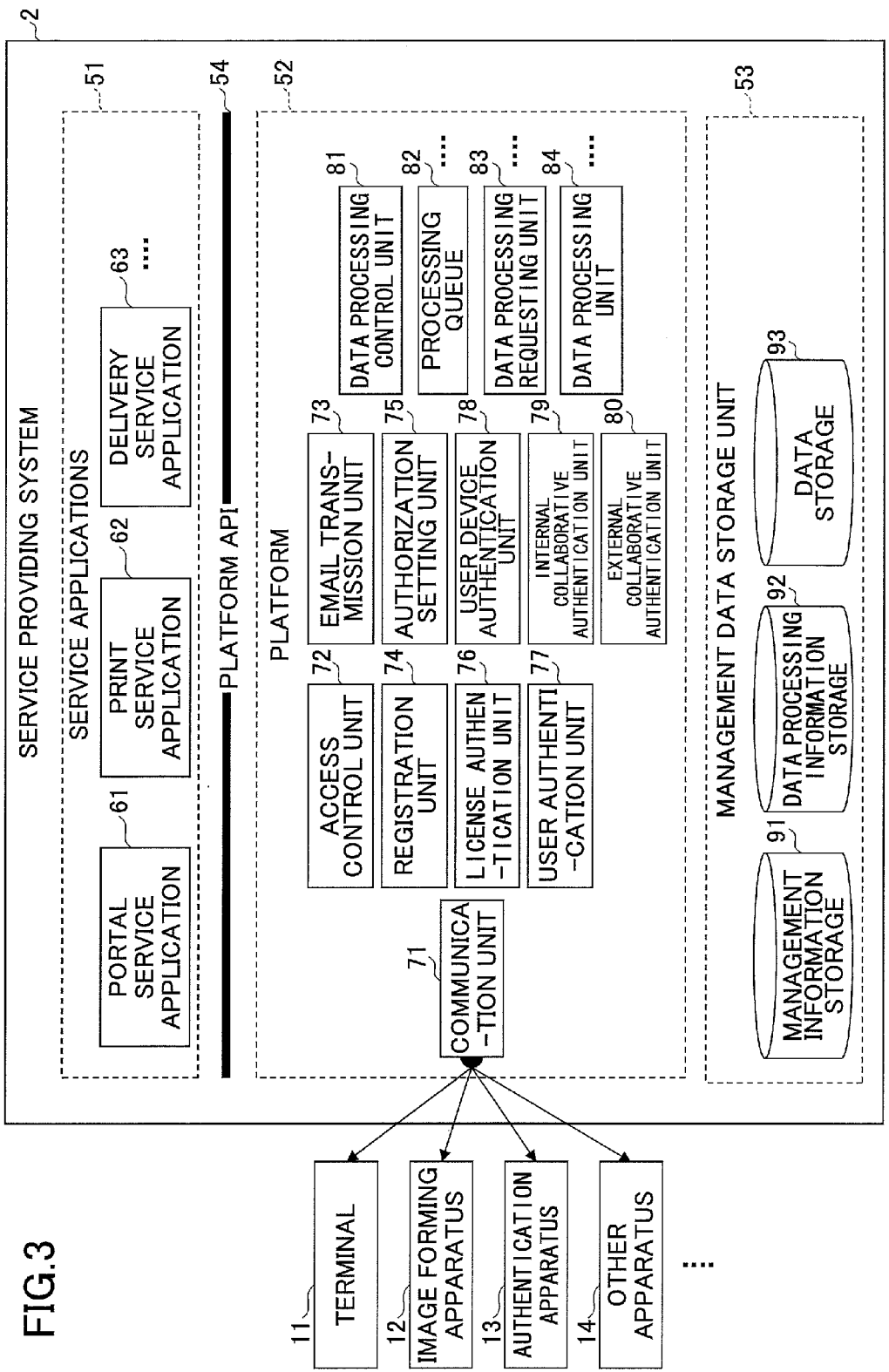
FIG. 3 is a block diagram illustrating an exemplary functional configuration of a service providing system.

FIG. 3 is a block diagram illustrating an exemplary functional configuration of the service providing system 2. The service providing system 2 of FIG. 3 implements service applications 51, a platform 52, a management data storage unit 53, and a platform API (application programming interface) 54 by executing programs.

In the example of FIG. 3, the service applications 51 include a portal service application 61, a print service application 62, and a delivery service application 63. The service applications 51 include functions for providing services.

The portal service application 61 is provided in the portal service providing apparatus 24 of FIG. 1. The print service application 61 is provided in the print service providing apparatus 22. The delivery service application 63 is provided in the delivery service providing apparatus 23.

The portal service application 61 provides a portal site that enables a user to use various services such as a print service and a delivery service. The portal service application 61 performs, in collaboration with the platform 52, a tenant registration process, a service registration process, and a management information registration process to enable the user to use various services.

The print service application 62, for example, stores print data and sends the print data to the image forming apparatus 12, and thereby provides a print service for printing information on the image forming apparatus 12.

The delivery service application 63 provides a delivery service. For example, the delivery service application 63 processes image data sent from an apparatus such as the image forming apparatus 12 and delivers the processed image data to the online storage 32 of FIG. 1.

The service applications 51 are not limited to the examples illustrated in FIG. 1. For example, the service applications 51 may also include an application that provides a service to send stored image data (projection data) to a projector (the other apparatus 14). Further, the service applications 51 may include an application that provides a service to send stored image data (projection data) to an electronic blackboard (the other apparatus 14). Thus, the service applications 51 may include various applications that provide services to apparatuses such as the image forming apparatus 12 used by the user.

The platform API 54 is an interface that enables the service applications 51 to use the platform 52. In other words, the platform API 54 is a predefined interface that enables the platform 52 to receive requests from the service applications 51, and may be implemented by functions or classes. When the service providing system 2 is implemented by (or distributed to) multiple information processing apparatuses, a Web API that is accessible via a network may be used as the platform API 54.

The platform 52 may include a communication unit 71, an access control unit 72, an email transmission unit 73, a registration unit 74, an authorization setting unit 75, a license authentication unit 76, a user authentication unit 77, a user device authentication unit 78, an internal collaborative authentication unit 79, an external collaborative authentication unit 80, a data processing control unit 81, one or more processing queues 82, one or more data processing requesting units 83, and one or more data processing units 84.

The communication unit 71 is a functional unit that communicates with apparatuses such as the image forming apparatus 12, and may be provided, for example, in the access control apparatus 21 of FIG. 1. The access control unit 72 is a functional unit that performs access control for accesses from apparatuses such as the image forming apparatus 12 to the service providing system 2, and may be provided, for example, in the access control apparatus 21.

The email transmission unit 73 is a functional unit that transmits email messages, and may be provided, for example, in the authentication apparatus 26 of FIG. 1. The registration unit 74 is a functional unit that registers various types of management data in the management data storage unit 53, and may be provided, for example, in the authentication apparatus 26. The authorization setting unit 75 is a functional unit that performs authorization setting for an external service such as the online storage 32, and may be provided in the authentication apparatus 26.

The license authorization unit 76 is a functional unit that performs authentication of a license based on license information and tenant information stored in the management data storage unit 53, and may be provided, for example, in the authentication apparatus 26. The user authentication unit 77 is a functional unit that performs user authentication based on a login request from an apparatus such as the terminal 11 for which device authentication is not necessary, and may be provided, for example, in the authentication apparatus 26. The user device authentication unit 78 is a functional unit that performs user authentication based on a login request from an apparatus such as the image forming apparatus 12 for which device authentication is necessary, and may be provided, for example, in the authentication apparatus 26.

The internal collaborative authentication unit 79 is a functional unit that performs user authentication for a user who attempts to log into the service providing system 2 using a user ID that is obtained from the authentication apparatus 13 of FIG. 1 after the user is authenticated by the authentication apparatus 13 via, for example, the image forming apparatus 12, and may be provided, for example, in the authentication apparatus 26. The external collaborative authentication unit 80 is a functional unit that performs an authentication process for a user logging into the online storage 32, and may be provided, for example, in the authentication apparatus 26.

The data processing control unit 81 is a functional unit that controls data processing performed in response to requests from the service applications 51, and may be provided, for example, in the data processing control apparatus 27. The processing queues 82 are message queues corresponding to different types of data processing. The data processing control unit 81 registers messages regarding requested data processing in the processing queues 82. The processing queues 82 may be provided, for example, in the data processing control apparatus 27.

The data processing requesting units 83 monitor the corresponding processing queues 82 that are assigned to them, and receive messages regarding requested data processing from the processing queues 82. The data processing requesting units 83 are functional units that request the data processing units 84 to perform data processing corresponding to the received messages, and may be provided in the data processing execution control apparatus 28.

The data processing units 84 are functional units that perform data processing requested by the data processing requesting units 83, and may be provided in the data processing apparatus 29. Examples of data processing performed by the data processing units 84 include a division process for dividing a request from the service application 51 into multiple requests, a data format conversion process for converting a data format, an optical character recognition (OCR) process, and an upload process for uploading data into the online storage 32.

Depending on the types of data processing, both of the data processing requesting units 83 and the data processing units 84 may be provided in the data processing execution control apparatus 28.

The management data storage unit 53 includes, for example, a management information storage 91, a data processing information storage 92, and a data storage 93.

The management information storage 91 stores management information including license information, tenant information, user information, and apparatus information. The management information storage 91 may be provided, for example, in the authentication apparatus 26. The data processing information storage 92 stores information related to requested data processing. The data processing information storage 92 may be provided, for example, in the data processing control apparatus 27. The data storage 93 stores other types of data such as application data and print data. The data storage 93 may be provided, for example, in the data processing control apparatus 27.

Examples of management data stored in the management data storage unit 53 are described below. FIG. 4 is a table illustrating exemplary license information. The license information includes data items (or fields) such as a license type, an ID, a registration code, and a registration status. The license type indicates the type of license. Types of licenses include "tenant", "print service", and "delivery service". The ID is an identifier of a license and is used for license authentication. The registration code is information used to register a tenant. The registration status indicates whether registration of a license (i.e., registration of an ID) by the user has been completed (i.e., whether the license has been registered).

FIG. 5 is a table illustrating exemplary tenant information. The tenant information includes data items (or fields) such as a tenant ID, a name, a service ID, a service type, a period of validity, an external service, address information, and utilization area information. The tenant ID is an ID of a tenant whose license type in the license information is "tenant". The tenant ID is registered when the user registers a tenant.

The name indicates, for example, a company name or an organization name that is set by the user when registering a tenant. The service ID is an ID of a service whose license type in the license information is, for example, "print service" or "delivery service". The service ID is registered when the user registers a service after registering a tenant.

The service type indicates a license type (or the type of service) corresponding to the service ID. The period of validity indicates a period for which the service ID is valid. The period of validity of a service ID starts when the service ID is registered in an apparatus.

The external service indicates a service that is used in conjunction with the service providing system 2. The online storage 32 of FIG. 1 is an example of the external service. The address information indicates an email address of an administrator that is registered when a tenant is registered. The utilization area information indicates a country or a region where a service is used. For example, an account, a password, an authorization token, and a scope described later are used to use an external service.

In the present embodiment, "authorization" indicates a process of setting a usage range (or a right) that defines services used by a user or services that a user is allowed to use. The authorization can be performed, for example, by using a standard API authorization technology called "OAuth". From a perspective that the service providing system 2 uses an external service such as the online storage 32, the external service corresponds to a service provider in OAuth and the service providing system 2 corresponds to a consumer in OAuth.

FIG. 6 is a table illustrating exemplary user information. The user information includes data items (or fields) such as a tenant ID; a login user ID and a login password; an internal authentication user ID; an account (online storage account), a password (online storage password), an authorization token, and a scope for online storages; and address information.

In the user information, records of users are grouped by tenant IDs. The login user ID and the login password are authentication information that is used for user authentication performed to log into the service providing system 2. The login user ID may be any type of information such as a user name that can be used to identify a user when the user logs into the service providing system 2. The internal authentication user ID is user identification information that is used by the authentication apparatus 13 of the office network N1 to identify a user. In an internal collaborative authentication process described later, the internal authentication user ID is obtained from the authentication apparatus 13 and used for user authentication performed to log into the service providing system 2. The internal authentication user ID may be any type of information that can be used by the authentication apparatus 13 of the office network N1 to identify a user. For example, the internal authentication user ID may be a card ID of an IC card or a terminal ID of a mobile terminal being carried by a user.

The account and the password for online storage are authentication information used to log into the online storage 32. The authorization token is information for using the online storage 32 within a given right. The scope identifies a usage range set by "authorization".

The account may be represented by any type of information such as a user ID, a user name, or an address for online storage that can be used for authentication when the user logs into the online storage 32. The address information indicates an email address of the user.

FIG. 7 is a table illustrating exemplary apparatus information. The apparatus information includes data items (or fields) such as a tenant ID, an apparatus ID, a service ID, a service type, a starting date, and an expiration date. In the apparatus information, records of apparatuses are grouped by tenant IDs.

The apparatus ID is an identifier of an apparatus and is used for device authentication. The apparatus ID may be represented, for example, by a serial number of the apparatus. The service ID and the service type are the same data items as those in the tenant information. The service ID and the service type are registered in the apparatus information when the user registers the service ID on an apparatus.

The starting date indicates a date when a service ID is registered. The expiration date indicates a date when the validity of a registered service ID expires. An apparatus registered in the apparatus information can use a service corresponding to the registered service ID from the starting date to the expiration date of the service ID.

For some types of services or licenses, the expiration date may not be specified (i.e., the period of validity is substantially unlimited). In the present embodiment, it is assumed that even apparatuses not registered in the apparatus information can use some services (or functions) provided by the service providing system 2 except for services that require device authentication.

In the present embodiment, the terminal 11 is an example of an apparatus that does not need to be registered in the apparatus information, and the image forming apparatus 12 is an example of an apparatus that needs to be registered in the apparatus information.

Examples of functions that can be used by the terminal 11 include registration of management data, and entry and deletion of print data. Examples of functions that can be used by the image forming apparatus 1 include acquisition of print data and transmission of delivery data.

Whether device authentication is necessary to use a function can be determined by a provider of the function (service). There may exist services that do not require device authentication.

FIG. 8 is a table illustrating exemplary external service information. The external service information includes data items (or fields) such as an external service ID, a service name, a client ID, a client secret, a product name, a scope, an authorization URL, and a redirection URL. The external service ID is an identifier of an external service.

The service name is a name of the external service. The client ID is an identifier of the service providing system 2 and is issued by the external service. The client secret is secret information used to guarantee the authenticity of the client ID, and functions like a password. The product name is an identifier of a service application 51. The scope identifies a usage range of the external service. The authorization URL is a uniform resource locator (URL) of an authorization system of the external service (e.g., a URL of an authorization server of the external service). The redirection URL is a URL of the service providing system 2 to which a user or an apparatus is redirected from the external service (e.g., a URL of a function of the authorization setting unit 75 that serves as an authorized client).

As described above, the tenant ID is associated with services provided by the service providing system 2, users who use the services, and apparatuses that use the services. Thus, the tenant ID is used to manage users, apparatuses, and services in the service providing system 2. Also, the tenant ID is used to determine which services of the service providing system 2 are provided to which users and apparatuses. In this sense, the tenant ID may be referred to as "use target identification information".

<<Processes>>

Exemplary processes performed by the information processing system 1 are described below.

<Process from Tenant Registration to Service Registration>

Figure 9:
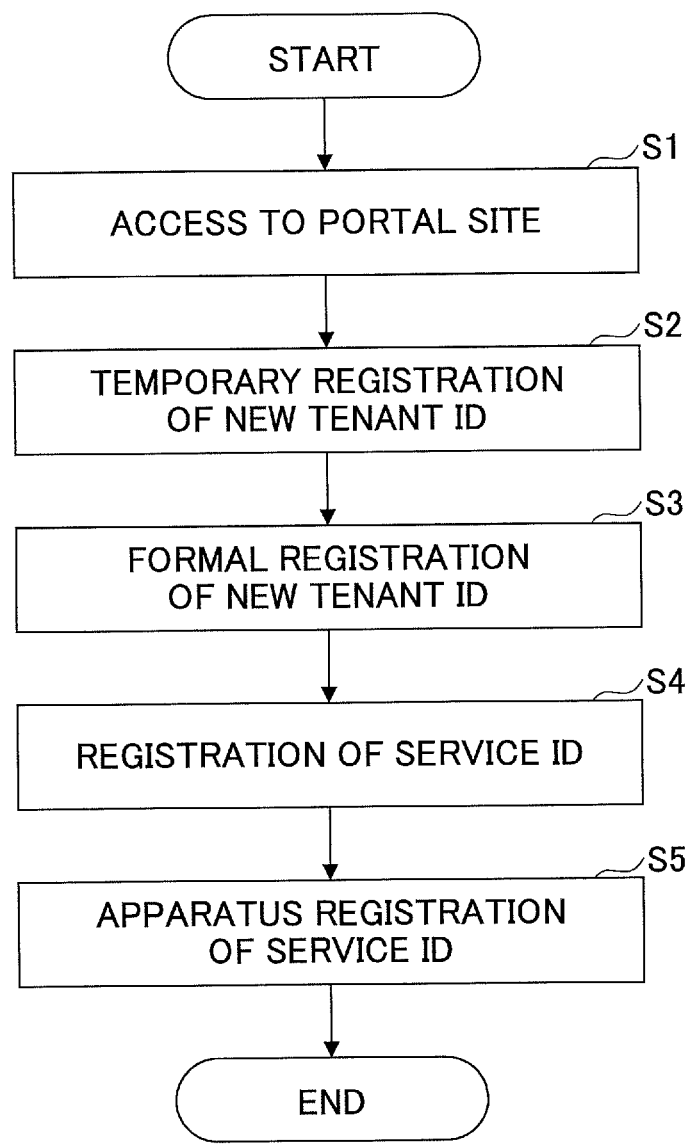
FIG. 9 is a flowchart illustrating an exemplary process from tenant registration to service registration.

FIG. 9 is a flowchart illustrating an exemplary process from tenant registration to service registration. A user (e.g., an administrator of a company or an organization) intending to perform tenant registration obtains a tenant ID and a registration code from a service provider (e.g., personnel who provides and sells services) of the service providing system 2.

For example, the user obtains the tenant ID and the registration code directly from the service provider or by accessing a dedicated site run by the service provider from the terminal 11 of the user.

At step S1, the user operates the input unit 501 of the terminal 11 to cause the terminal 11 to access a portal site of the service providing system 2. Based on the operation performed by the user, the terminal 11 accesses the portal site of the service providing system 2.

When the access to the portal site from the terminal 11 is detected, the access control unit 72 of the service providing system 2 allows the terminal 11 to access the portal service application 61.

The portal service application 61 causes the display unit 502 of the terminal 11 to display a top screen. On the top screen, the user can select whether to request login or request new tenant registration by operating the input unit 501 of the terminal 11. In this exemplary process, it is assumed that the user selects to request new tenant registration. On the other hand, when the user (an administrator or any other user) has already been registered in the user information stored in the management information storage 91, the user can select to request login by entering a tenant ID, a user ID, and a password.

When new tenant registration is requested, the portal service application 61 of the service providing system 2, at step S2, causes the display unit 502 of the terminal 11 to display an input screen for performing temporary registration of the tenant ID. The user operates the input unit 501 of the terminal 11 to enter information for temporary registration of the tenant ID, and then requests the temporary registration. Based on the operation performed by the user, the terminal 11 requests the portal site of the service providing system 2 to temporarily register the tenant ID.

The information for temporary registration of a tenant ID includes, for example, information (utilization area information) indicating a country or a region where a service is used, and information indicating agreement to terms of service (or conditions) that are displayed depending on the country or region where the service is used. The information for temporary registration of the tenant ID also includes the tenant ID, the registration code, an email address, and a language used.

The service providing system 2 retains information representing the terms of service for each country or region. The portal service application 61 of the service providing system 2 causes the display unit 502 of the terminal 11 to display the terms of service corresponding to the utilization area information entered by the user for temporary registration of the tenant ID, and requests the user to select whether to agree to the terms of service.

Figure 10:
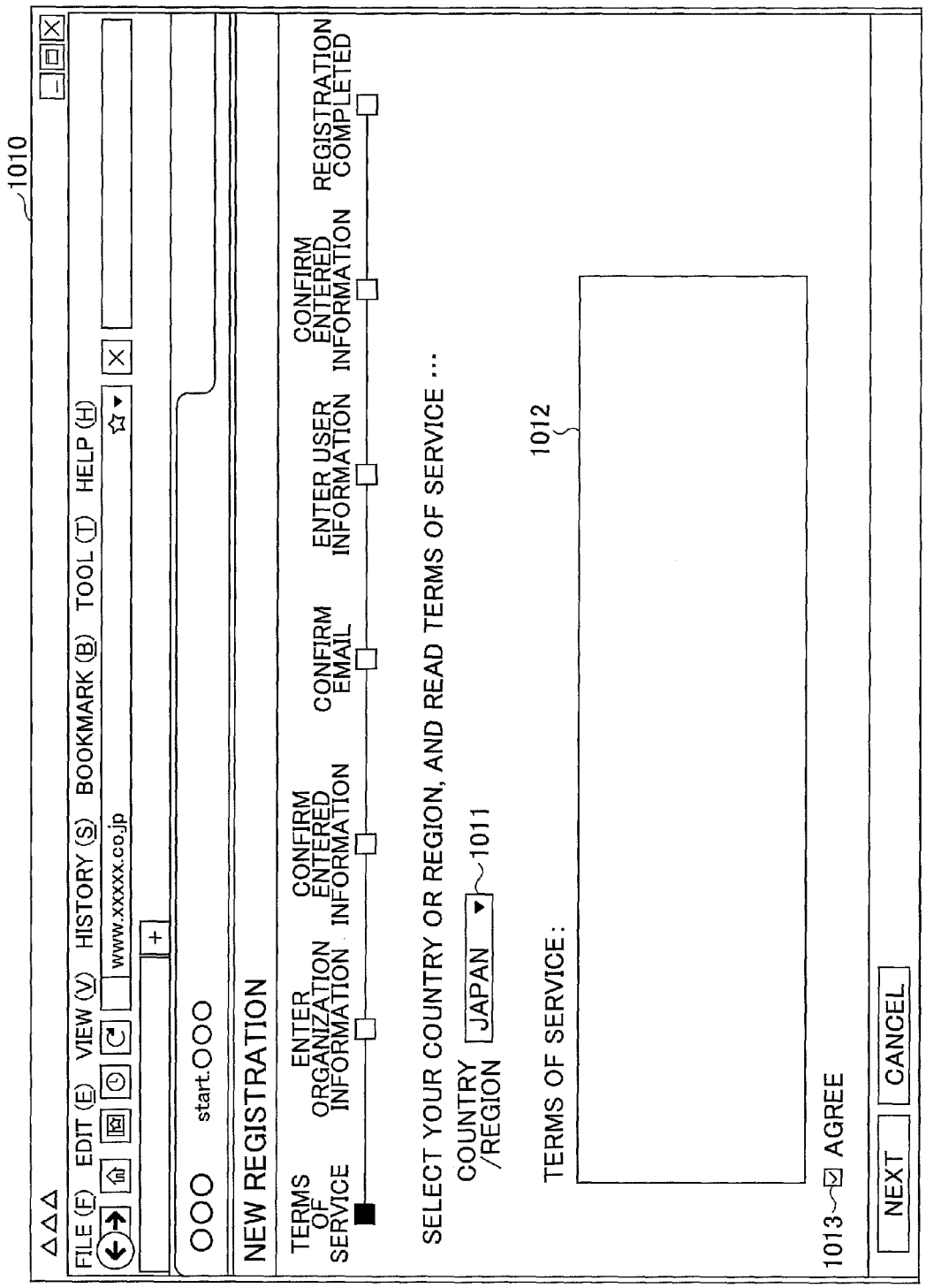
FIG. 10 is a drawing illustrating an exemplary terms-of-service screen.

FIG. 10 is a drawing illustrating an exemplary terms-of-service screen 1010. The terms-of-service screen 1010 includes a selection field 1011 enabling the user to select a country or region where a service is used, a terms-of-service field 1012 for displaying terms of service corresponding to the selection field 1011, and a check box 1013 enabling the user to select whether to agree to the terms of service.

When the temporary registration is requested by the terminal 11 of the user, the portal service application 61 requests the license authentication unit 76 to confirm the validity of the tenant ID and the registration code included in the information entered for the temporary registration of the tenant ID. When requested, the license authentication unit 76 performs a license authentication process to determine (or verify) whether the tenant ID and the registration code are present in the license information of FIG. 4 stored in the management information storage 91.

When the tenant ID and the registration code are present in the license information, the license authentication unit 76 determines whether the registration status associated with the tenant ID and the registration code is "non-registered".

When the registration status is "non-registered", the license authentication unit 76 determines that the tenant ID and the registration code are valid, and authenticates the tenant ID (i.e., a license). The license authentication unit 76 reports the authentication result to the portal service application 61.

When the tenant ID and the registration code are valid, the portal service application 61 requests the registration unit 74 to register the tenant ID, the email address, and the utilization area information included in the information entered for the temporary registration of the tenant ID. In response to the request from the portal service application 61, the registration unit 74 registers the tenant ID, the email address, and the utilization area information in the tenant information stored in the management information storage 91.

After the registration by the registration unit 74, the portal service application 61, at step S3, generates a formal registration URL to be accessed to display a formal registration screen, and generates an email message including the formal registration URL. The portal service application 61 request the email transmission unit 73 to transmit the generated email message. The email transmission unit 73 transmits the email message to the email address included in the information entered for temporary registration of the tenant ID.

When the email message is transmitted by the email transmission unit 73, the portal service application 61 causes the display unit 502 of the terminal 11 to display a report screen reporting that the email message has been transmitted. The formal registration URL is managed by a period of validity (e.g., one hour) that starts, for example, when the formal registration URL is generated. Also, to improve security, at least one of the tenant ID and the registration code is not included in the email message transmitted by the email transmission unit 73.

Next, the user operates the input unit 501 of the terminal 11 to cause the terminal 11 to access the formal registration URL in the email message received from the email transmission unit 73. Based on the operation performed by the user, the terminal 11 accesses the formal registration URL. The terminal 11 used to access the formal registration URL may not be the same as the terminal 11 used to request the temporary registration. The access control unit 72 allows the terminal 11 to access the portal service application 61.

The portal service application 61 determines whether the access to the formal registration URL is valid (i.e., whether the access is to the generated formal registration URL, and whether the access is made within the period of validity). When the access is valid, the portal service application 61 causes the display unit 502 of the terminal 11 to display a formal registration screen.

The user operates the input unit 501 of the terminal 11 to enter information for formal registration of the tenant ID on the formal registration screen, and then requests the formal registration. The information to be entered on the formal registration screen includes tenant information including the tenant ID, a name, and the registration code; and user information including a login user ID, a login password, and the address information. The formal registration screen may be configured such that one of the tenant ID and the registration code already entered by the user for the temporary registration of the tenant ID is automatically entered and displayed in the corresponding input field. However, to improve security, at least one of the tenant ID and the registration code to be entered by the user on the formal registration screen is not included in the email message including the formal registration URL.

When the formal registration is requested by the terminal 11 of the user, the portal service application 61 requests the license authentication unit 76 to perform a license validation process (or a formal registration process) based on the tenant ID and the registration code entered on the formal registration screen.

When requested, the license authentication unit 76 performs a license authentication process to determine whether the tenant ID and the registration code entered on the formal registration screen are present in the license information stored in the management information storage 91. When the tenant ID and the registration code are present in the license information and the registration status associated with the tenant ID and the registration code is "non-registered", the license authentication unit 76 determines that the tenant ID and the registration code are valid.

When the tenant ID and the registration code are valid, the license authentication unit 76 requests the registration unit 74 to change the registration status in the license information stored in the management information storage 91. The registration unit 74 changes the value of the registration status recorded in the license information in association with the valid tenant ID and registration code to "registered".

After the license validation process is completed, the portal service application 61 requests the registration unit 74 to register the tenant information and the user information entered by the user on the formal registration screen via the terminal 11. The registration unit 74 registers the name entered as a part of the tenant information on the formal registration screen in tenant information stored in the management information storage 91. The registration unit 74 also registers the tenant ID, the login user ID, the login password, and the address information in user information stored in the management information storage 91.

After the registration unit 74 completes the registration of the tenant information and the user information, the portal service application 61 causes the display unit 502 of the terminal 11 to display a tenant registration completion screen. The portal service application 61 also generates an email message including a tenant registration completion report, and requests the email transmission unit 73 to transmit the generated email message. The email transmission unit 73 transmits the email message including the tenant registration completion report to the email address entered by the user via the terminal 11 for temporary registration of the tenant ID (i.e., the email address indicated by the address information registered in the tenant information).

The user confirms the tenant registration completion screen displayed on the display unit 502 of the terminal 11. Once the registration of the tenant ID, the user ID, and the password is completed, the user can request login on the top screen of the portal site from the next time. Also, by logging into the service providing system 2, the user can register tenant information, user information, and apparatus information in association with the tenant ID.

At step S4, the user such as an administrator operates the input unit 501 of the terminal 11 to enter the tenant ID, the user ID, and the password on the top screen of the portal site and request login.

When a login request is received, the portal service application 61 requests the user authentication unit 77 to perform user authentication. The user authentication unit 77 determines (or verifies) whether the combination of the tenant ID, the user ID, and the password received from the terminal 11 is present in user information stored in the management information storage 91.

When the combination of the tenant ID, the user ID, and the password received from the terminal 11 is present in the user information, the user authentication unit 77 authenticates the user who requested the login. When the user is authenticated by the user authentication unit 77, the portal service application 61 allows the user to log in.

After logging into the portal service application 61, the user can register a service ID of a service that the user intends to use. The portal service application 61 causes the display unit 502 of the terminal 11 to display a service registration screen for registering a service ID. The user operates the input unit 501 of the terminal 11 to enter a service ID on the service registration screen displayed on the display unit 502 and requests service registration. Based on the operation performed by the user, the terminal 11 requests the portal service application 61 to perform service registration.

When the service registration is requested by the terminal 11 of the user, the portal service application 61 refers to the license information stored in the management information storage 91, and selects an ID that matches the service ID entered by the user on the service registration screen. Then, the portal service application 61 obtains a license type (or a service type) associated with the selected ID.

The portal service application 61 also refers to the tenant information stored in the management information storage 91, and obtains utilization area information associated with the tenant ID of the logged-in user. The portal service application 61 causes the display unit 502 of the terminal 11 to display terms of service corresponding to the obtained license type and utilization area information, and requests the user to select whether to agree to the terms of service.

The service providing system 2 retains information representing the terms of service (or conditions) for each combination of a service type (license type) and a country or region where a service is used. Thus, the portal service application 61 can perform a display control to display the terms of service that correspond to the utilization area information entered by the user for temporary registration of the tenant ID and to the service type of a service whose registration is requested, and request the user to select whether to agree to the terms of service.

When the user selects an option to agree to the terms of service by operating the input unit 501 of the terminal 11, the portal service application 61 requests the license authentication unit 76 to perform a service registration process based on the tenant ID of the logged-in user and the service ID entered on the service registration screen.

The license authentication unit 76 determines (or verifies) whether the service ID entered on the service registration screen is present in the ID field of the license information stored in the management information storage 91. When the service ID entered on the service registration screen is present in the ID field of the license information, the license authentication unit 76 determines that the service ID is valid (i.e., authenticates the service ID). When the service ID is valid, the license authentication unit 76 requests the registration unit 74 to register the service ID. The registration unit 74 registers the service ID and the service type in the tenant information stored in the management information storage 91 in association with the tenant ID of the logged-in user.

At step S5, the user such as an administrator performs apparatus registration of a service ID. The user operates the input unit 501 of the terminal 11 to cause the display unit 502 of the terminal 11 to display an apparatus registration screen. The user operates the input unit 501 of the terminal 11 to enter, on the apparatus registration screen, a service ID and an apparatus ID of an apparatus that is to be enabled to use a service with the service ID, and request apparatus registration of the service ID.

When the apparatus registration of the service ID is requested by the terminal 11, the portal service application 61 requests the license authentication unit 76 to perform an apparatus registration process of the service ID based on the service ID and the apparatus ID entered on the apparatus registration screen.

The license authentication unit 76 determines (or verifies) whether the combination of the tenant ID of the logged-in user and the service ID entered on the apparatus registration screen is present in the tenant information stored in the management information storage 91.

When the combination of the tenant ID of the logged-in user and the service ID entered on the apparatus registration screen is present in the tenant information, the license authentication unit 76 refers to the license information stored in the management information storage 91. The license authentication unit 76 determines whether the registration status recorded in the license information in association with the service ID entered on the apparatus registration screen is "non-registered".

When the registration status is "non-registered", the license authentication unit 76 requests the registration unit 74 to perform apparatus registration of the service ID. Here, when the registration status of a service ID is "non-registered", it indicates that apparatus registration of the service ID has not been performed. The registration unit 74 registers the tenant ID of the logged-in user and the service ID and the apparatus ID entered on the apparatus registration screen in the apparatus information stored in the management information storage 91. The registration unit 74 also refers to the tenant information stored in the management information storage 91, and obtains a service type and a period of validity associated with the combination of the tenant ID and the service ID. Based on the obtained service type and period of validity, the registration unit 74 registers the service type, a starting date, and an expiration date in the apparatus information stored in the management information storage unit 91.

For the starting date, the date on which the apparatus registration of the service ID is performed is registered. For the expiration date, the last date of the period of validity (e.g., one year) is registered. The last date is calculated based on the period of validity obtained from the tenant information and the starting date. Alternatively, the starting date may be specified, for example, when requesting the service registration at step S4. When the starting date is specified at the step of requesting the service registration, the specified starting date is registered in the apparatus information. After the apparatus registration of the service ID is completed, the registration unit 74 changes the value of the registration status recorded in the license information in association with the service ID to "registered".

Through the process from the tenant registration to the service registration described above, a user such as an administrator can perform registration of a tenant ID, registration of a service ID, and apparatus registration of the service ID by accessing the service providing system 2 from the terminal 11. Thus, the above configuration enables a user to easily perform a procedure necessary to receive a service. Also, the service providing system 2 can manage services to be provided, users who use the services, and apparatuses that use the services based on tenant IDs for which the license validation process has been performed.

<User and Device Authentication Functions>

Figure 11:
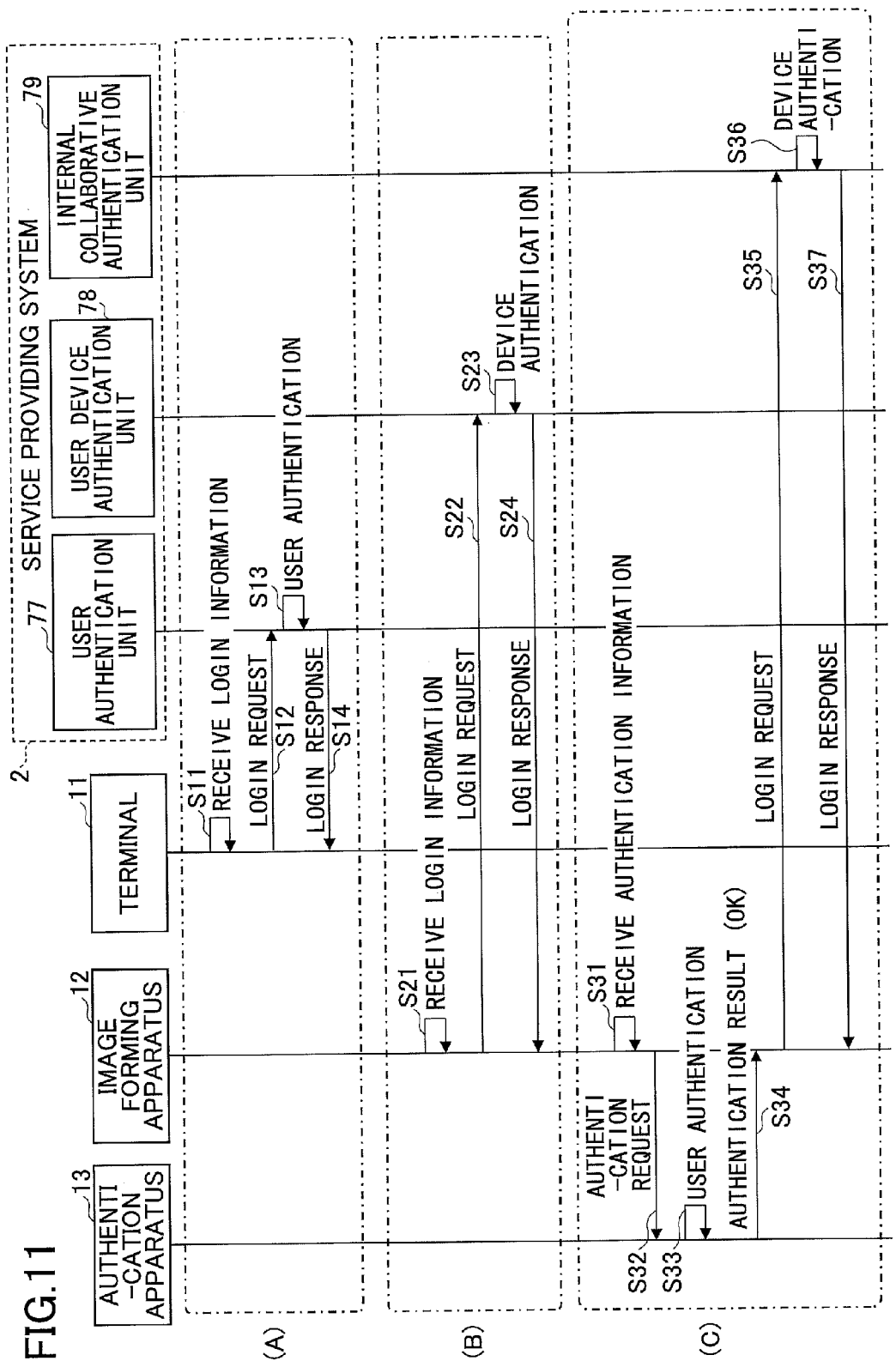
FIG. 11 is a sequence chart illustrating exemplary user and device authentication processes.

FIG. 11 is a sequence chart illustrating exemplary user and device authentication processes. FIG. 11 (A) illustrates a user authentication process based on a request from the terminal 11 for which device authentication is not necessary. FIG. 11 (B) illustrates a user device authentication process based on a request from the image forming apparatus 12 for which device authentication is necessary. FIG. 11 (C) illustrates an internal collaborative authentication process based on a request from the image forming apparatus 12 for which device authentication is necessary.

As illustrated by FIG. 11 (A), in a user authentication process based on a request from the terminal 11, the user enters login information including a tenant ID, a user ID, and a password on the top screen of the portal site. At step S11, the terminal 11 receives the login information entered by the user.

At step S12, the terminal 12 sends a login request to the service providing system 2 based on the login information entered by the user. The access control unit 72 of the service providing system 2 requests the user authentication unit 77 to perform user authentication.

At step S13, the user authentication unit 77 determines whether the login information received from the terminal 11 is present in the user information stored in the management information storage 91. When the login information received from the terminal 11 is present in the user information stored in the management information storage 91, the user authentication unit 77 determines that the user authentication has succeeded. When the login information received from the terminal 11 is not present in the user information, the user authentication unit 77 determines that the user authentication has failed.

When the user authentication has succeeded, the access control unit 72 allows login (for using a service) from the terminal 11 into the service providing system 2. At step S14, the access control unit 72 sends, to the terminal 11, a login response based on the result of the user authentication performed by the user authentication unit 77.

In FIG. 11 (B) and FIG. 11 (C), it is assumed that the image forming apparatus 12 retains a setting indicating whether a login user ID and a login password, or an internal authentication user ID is used for user authentication performed to log into the service providing system 2. The setting indicating whether to use a login user ID and a login password, or an internal authentication user ID may be changed as necessary. It is also assumed that the image forming apparatus 12 retains a tenant ID and an apparatus ID in a storage area of its own.

When the setting indicates that a login user ID and a login password are used, the image forming apparatus 12 performs a user device authentication process as illustrated by FIG. 11 (B) to log into the service providing system 2.

At step S21, the image forming apparatus 12 displays an input screen that requests the user to enter a login user ID and a login password. On the input screen displayed by the image forming apparatus 12, the user enters a login user ID and a login password. Then, the image forming apparatus 12 receives the login user ID and the login password entered by the user.

At step S22, the image forming apparatus 12 sends, to the service providing system 2, login information including the login user ID and the login password entered by the user and the tenant ID and the apparatus ID retained in its storage area, and thereby requests login. The access control unit 72 of the service providing system 2 requests the user device authentication unit 78 to perform user device authentication.

At step S23, the user device authentication unit 78 determines whether the combination of the tenant ID and the apparatus ID included in the login information received from the image forming apparatus 12 is present in the apparatus information stored in the management information storage 91. When the combination of the tenant ID and the apparatus ID is present in the apparatus information, the user device authentication unit 78 determines that device authentication has succeeded. When the combination of the tenant ID and the apparatus ID is not present in the apparatus information, the user device authentication unit 78 determines that device authentication has failed.

The user device authentication unit 78 also determines whether the combination of the tenant ID, the login user ID, and the login password included in the login information received from the image forming apparatus 12 is present in the user information stored in the management information storage 91. When the combination of the tenant ID, the login user ID, and the login password included in the login information received from the image forming apparatus 12 is present in the user information stored in the management information storage 91, the user device authentication unit 78 determines that user authentication has succeeded. When the combination of the tenant ID, the login user ID, and the login password included in the login information received from the image forming apparatus 12 is not present in the user information, the user device authentication unit 78 determines that user authentication has failed.

When the device authentication and the user authentication have succeeded, the access control unit 72 allows login (for using a service) from the image forming apparatus 12 into the service providing system 2. At step S24, the access control unit 72 sends, to the image forming apparatus 12, a login response based on the results of the device authentication and the user authentication performed by the user device authentication unit 78.

When the setting indicates that an internal authentication user ID is used, the image forming apparatus 12 performs an internal collaborative authentication process as illustrated by FIG. 11 (C) to log into the service providing system 2. First, the user receives user authentication at the image forming apparatus 12. The user authentication at the image forming apparatus 12 is performed to allow the user to use the image forming apparatus 12 or a function of the image forming apparatus 12. In the example of FIG. 11 (C), the authentication apparatus 13 performs user authentication based on a card ID stored in a card (e.g., an IC card) being carried by the user.

At step S31, the user causes a card reader (not shown) connected to the image forming apparatus 12 to read a card ID from a card to request user authentication. At step S32, the image forming apparatus 12 sends the card ID read by the card reader to the authentication apparatus 13 to request authentication.

At step S33, the authentication apparatus 13 performs authentication based on the card ID received from the image forming apparatus 12. The authentication apparatus 13 stores, in a storage area, user authentication information associating card IDs with user IDs (internal authentication user IDs). The authentication apparatus 13 refers to the user authentication information and determines whether an internal authentication user ID associated with the card ID received from the image forming apparatus 12 can be identified in the user authentication information.

When an internal authentication user ID associated with the card ID is identified, the authentication apparatus 13 determines that the user authentication has succeeded. At step S34, the authentication apparatus 13 sends the identified internal authentication user ID and an authentication result indicating that the user authentication has succeeded to the image forming apparatus 12.

When the user authentication has succeeded, the user can send a login request to the service providing system 2 by, for example, selecting a menu item for logging into the service providing system 2 on a screen displayed by the image forming apparatus 12. At step S35, the user requests login from the image forming apparatus 12 into the service providing system 2.

When the login to the service providing system 2 is requested by the user, the image forming apparatus 12 sends, to the service providing system 2, login information including the identified internal authentication user ID, and the tenant ID and the apparatus ID retained in its storage area, and thereby requests login. The access control unit 72 of the service providing system 2 requests the internal collaborative authentication unit 79 to perform internal collaborative authentication.

At step S36, the internal collaborative authentication unit 79 determines whether the combination of the tenant ID and the apparatus ID included in the login information received from the image forming apparatus 12 is present in the apparatus information stored in the management information storage 91.

When the combination of the tenant ID and the apparatus ID is present in the apparatus information, the internal collaborative authentication unit 79 determines that device authentication has succeeded. When the combination of the tenant ID and the apparatus ID is not present in the apparatus information, the internal collaborative authentication unit 79 determines that device authentication has failed.

The internal collaborative authentication unit 79 also determines whether the combination of the tenant ID and the internal authentication user ID included in the login information received from the image forming apparatus 12 is present in the user information stored in the management information storage 91. When the combination of the tenant ID and the internal authentication user ID included in the login information received from the image forming apparatus 12 is present in the user information stored in the management information storage 91, the internal collaborative authentication unit 79 determines that user authentication has succeeded.

When the combination of the tenant ID and the internal authentication user ID included in the login information received from the image forming apparatus 12 is not present in the user information, the internal collaborative authentication unit 79 determines that user authentication has failed.

When the device authentication and the user authentication have succeeded, the access control unit 72 allows login (for using a service) from the image forming apparatus 12 into the service providing system 2. At step S37, the access control unit 72 sends, to the image forming apparatus 12, a login response based on the results of the device authentication and the user authentication performed by the internal collaborative authentication unit 79.

When the device authentication has succeeded but the user authentication has failed, the service providing system 2 may cause the image forming apparatus 12 to display an input screen that requests the user to enter a login user ID and a login password.

With this configuration, the user can request login again by entering a login user ID and a login password on the displayed input screen. In this case, the image forming apparatus 12 sends, to the user device authentication unit 78 of the service providing system 2, the login user ID and the login password entered by the user and the tenant ID retained in its storage area, and thereby requests login.

The user device authentication unit 78 determines whether the combination of the tenant ID, the login user ID, and the login password received from the image forming apparatus 12 is present in the user information stored in the management information storage 91.

When the combination of the tenant ID, the login user ID, and the login password received from the image forming apparatus 12 is present in the user information stored in the management information storage 91, the user device authentication unit 78 determines that user authentication has succeeded. When the user authentication has succeeded, the access control unit 72 allows the login to the service providing system 2.

Also, the registration unit 74 registers the internal authentication user ID received from the image forming apparatus 12 in the user information stored in the management information storage 91 in association with the tenant ID, the login user ID, and the login password received from the image forming apparatus 12. Once the internal authentication user ID received from the image forming apparatus 12 is registered in the user information in association with the tenant ID, the login user ID, and the login password, the user can log into the service providing system 2 using the internal authentication user ID from the next time.

<Data Processing Function>

In the service providing system 2, the data processing control unit 81, the processing queues 82, the data processing requesting units 83, and the data processing units 84 of the platform 52 perform various types of data processing requested by a process requesting unit 101 of the service application 51 as described below.

Figure 12:
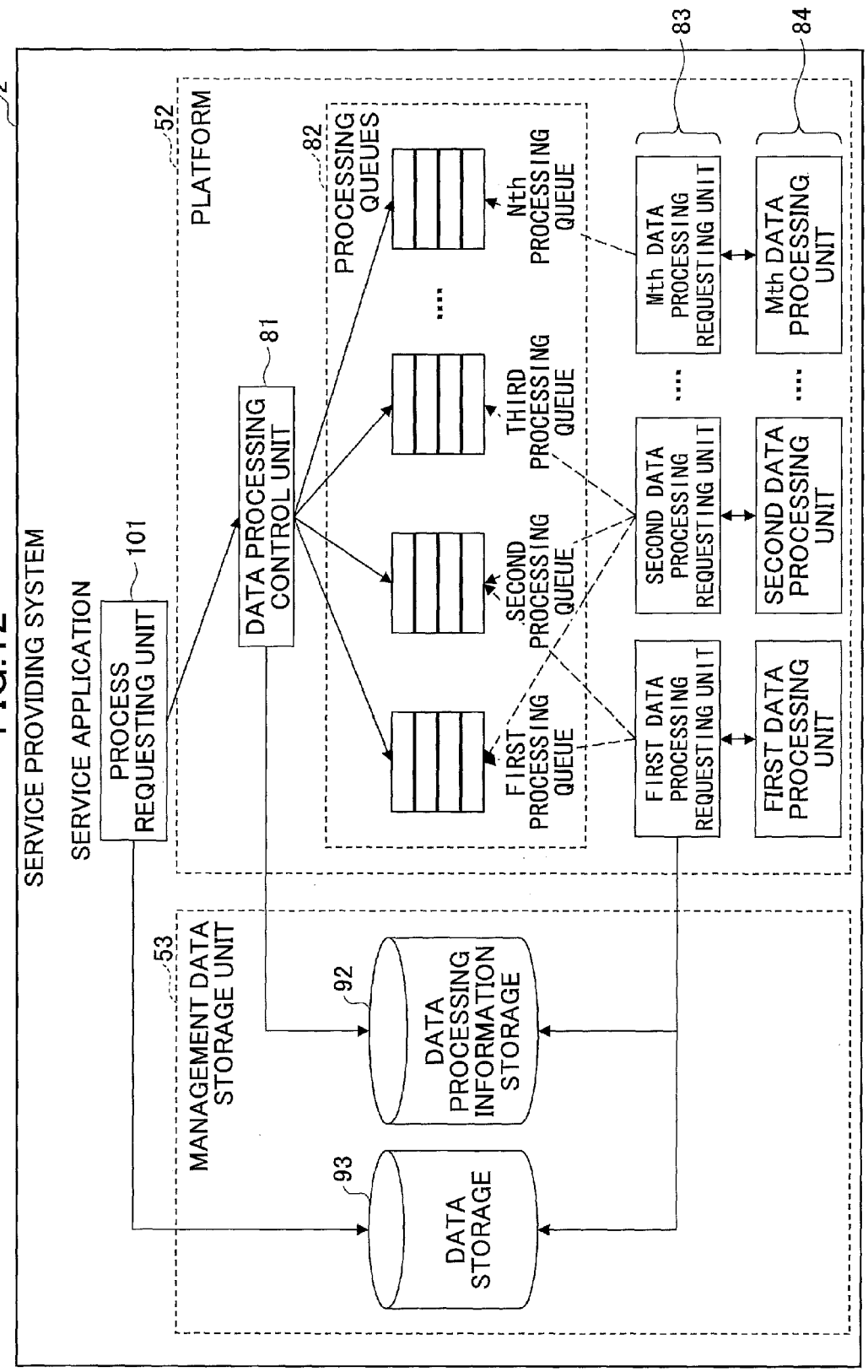
FIG. 12 is a drawing illustrating an exemplary data processing function of a service providing system.

FIG. 12 is a drawing illustrating an exemplary data processing function of the service providing system 2. The process requesting unit 101 of the service application 51 stores data to be processed (which is hereafter referred to as "process target data") in the data storage 93 of the management data storage unit 53. Examples of the process target data include application data and image data.

Also, the process requesting unit 101 sends a data processing request (which is hereafter referred to as a "request") to the data processing control unit 81 of the platform 52. The request includes process information indicating data processing (or a type of data processing) to be performed and a storage location (e.g., a URI) indicating a location where the process target data is stored.

The data processing control unit 81 analyzes the request received from the process requesting unit 101, and registers a message in one of the processing queues (message queues) 82 corresponding to the type of data processing indicated by the process information. The processing queues 82 are provided for respective types of data processing.

Also, the data processing control unit 81 registers request information regarding the request in the data processing information storage 92 of the management data storage unit 53. The request information includes the storage location of the process target data, the process information, and a request status indicating the status of the request.

The request status indicates, for example, "received", "in execution", and "completed". Thus, the request status indicates the status of requested data processing. At the stage when the request information is registered by the data processing control unit 81, the request status is "received".

Each data processing requesting unit 83 monitors one or more processing queues 82 assigned to itself. In other words, each data processing requesting unit 83 monitors one or more types of data processing requests. Each data processing requesting unit 83 obtains messages registered in the processing queues 82 that the data processing requesting unit 83 monitors.

In the example of FIG. 12, a first data processing requesting unit 83 monitors a first processing queue 82 and a second processing queue 82 for different types of data processing. A second data processing requesting unit 83 monitors first through third processing queues 82 for different types of data processing. Thus, in the example of FIG. 12, the first processing queue 82 and the second processing queue 82 are monitored by both of the first data processing requesting unit 83 and the second data processing requesting unit 83.

Assignment of the processing queues 82 to the data processing requesting units 83 may be set and changed as necessary. For example, assignment of the processing queues 82 to the data processing requesting units 83 may be set and changed based on the requested frequency and processing time of respective types of data processing.

The data processing requesting unit 83 obtains request information from the data processing information storage 92 based on a message obtained from a processing queue 82 that the data processing requesting unit 83 monitors. Based on a storage location of process target data and process information included in the obtained request information, the data processing requesting unit 83 causes the corresponding data processing unit 84 to perform data processing indicated by the process information.

Next, the data processing requesting unit 83 updates the request information based on the result of data processing performed by the data processing unit 84, and registers the updated request information in the data processing information storage 92. For example, in updating the request information, the data processing requesting unit 83 removes the process information (or a part of the process information) of the performed data processing from the request information and/or changes the request status. When the request information includes another set of process information indicating data processing to be performed next, the data processing requesting unit 83 registers a message in one of the processing queues 82 that corresponds to the type of the data processing indicated by the process information.

When the process target data is converted into a different type of data (processed data) as a result of the data processing performed by the data processing unit 84, the data processing requesting unit 83 stores the processed data in the data storage 93. In this case, the data processing control unit 83 updates the request information based on the storage location of the processed data.

Figure 13:
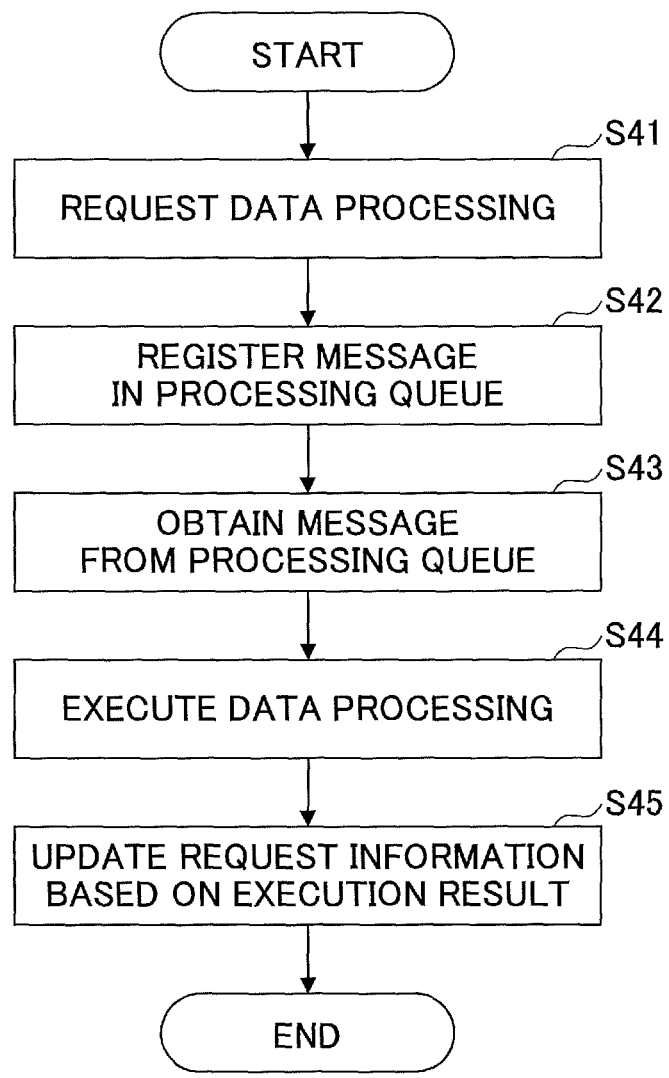
FIG. 13 is a flowchart illustrating an exemplary process performed by a data processing function of a service providing system.

FIG. 13 is a flowchart illustrating an exemplary process performed by a data processing function of the service providing system 2. At step S41, the process requesting unit 101 of the service application 51 stores process target data in the data storage 93 of the management data storage unit 53. Also, the process requesting unit 101 sends a data processing request (which is hereafter referred to as a "request") to the data processing control unit 81 of the platform 52.

At step S42, the data processing control unit 81 analyzes the request received from the process requesting unit 101, and registers a message in one of the processing queues 82 corresponding to the type of data processing indicated by process information included in the request. Also, the data processing control unit 81 registers request information regarding the request in the data processing information storage 92 of the management data storage unit 53.

At step S43, the data processing requesting unit 83 obtains a message registered in a processing queue 82 that the data processing requesting unit 83 monitors. At step S44, the data processing requesting unit 83 obtains request information from the data processing information storage 92 based on the obtained message. Based on the obtained request information, the data processing requesting unit 83 causes the corresponding data processing unit 84 to perform requested data processing.

At step S45, the data processing requesting unit 83 updates the request information based on the result of data processing performed by the data processing unit 84, registers the updated request information in the data processing information storage 92, and terminates the process of FIG. 13.

When the request information includes another set of process information indicating data processing to be performed next, the data processing requesting unit 83 registers a message in one of the processing queues 82 that corresponds to the type of data processing indicated by the process information.

Below, examples of data processing are described. However, data processing performed by the service providing system 2 is not limited to those examples. A first example of data processing is conversion of a data format of process target data (format conversion data processing).

Data processing for converting image data into PDF (Portable Document Format) data is an example of format conversion data processing. The data processing for converting image data into PDF data may be indicated, for example, by process information "image2pdf".

Data processing for converting PDF data into PDL (Page Description Language) data is also an example of format conversion data processing. The data processing for converting PDF data into PDL data may be indicated, for example, by process information "pdf2pdl".

Data processing for converting Microsoft Office (registered trademark) document data into PDL data is still another example of format conversion data processing. The data processing for converting Microsoft Office document data into PDL data may be indicated, for example, by process information "office2pdl".

In a second example of data processing, one data processing process is divided into two or more data processing processes, and each of the data processing processes is converted into a request for the corresponding data processing unit 84.

For example, data processing for converting image data into PDL data may be divided into data processing for converting image data into PDF data and data processing for converting the PDF data into PDL data. The data processing for converting image data into PDL data may be indicated by process information "image2pdl".

For example, one of the data processing units may be configured to perform data processing for dividing a data processing request "image2pdl" into data processing requests "image2pdf" and "pdf2pdl". Thus, one or more of the data processing units 84 may be configured to perform data processing for dividing a data processing request into multiple data processing requests.

With the above configuration, even when there is no data processing unit 84 that can perform data processing "image2pdl", it is possible to perform data processing "image2pdl" by linking data processing "image2pdf" and data processing "pdf2pdl".

Figure 14:
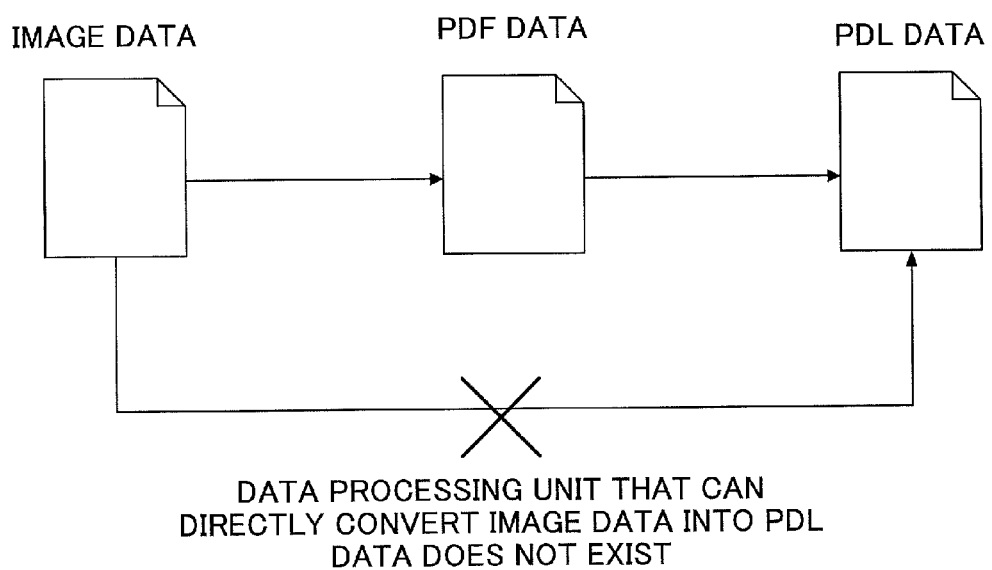
FIG. 14 is a drawing illustrating exemplary data processing for dividing a data processing request into multiple data processing requests.

FIG. 14 is a drawing illustrating exemplary data processing for dividing a data processing request into multiple data processing requests. In FIG. 14, it is assumed that there is no data processing unit 84 that can perform data processing "image2pdl".

FIG. 14 illustrates that data processing "image2pdl" can be performed by linking data processing "image2pdf" and data processing "pdf2pdl" even when there is no data processing unit 84 that can perform data processing "image2pdl".

Thus, the service providing system 2 of the present embodiment can perform data processing for dividing a data processing request (or a data processing process) into multiple data processing requests (or multiple data processing processes). This configuration enables the service providing system 2 to flexibly adapt to an increase in the number of types of data processing.

A third example of data processing is performed for collaboration with an external storage (collaborative data processing). Data processing for requesting the external collaborative authentication unit 80 to log into the online storage 32 with an online storage account and an online storage password corresponding to a logged-in user is an example of collaborative data processing.

Also, data processing for storing data in the online storage 32 after login and data processing for obtaining data from the online storage 32 after login are examples of collaborative data processing.

<Collaboration with Online Storage>

Figure 15:
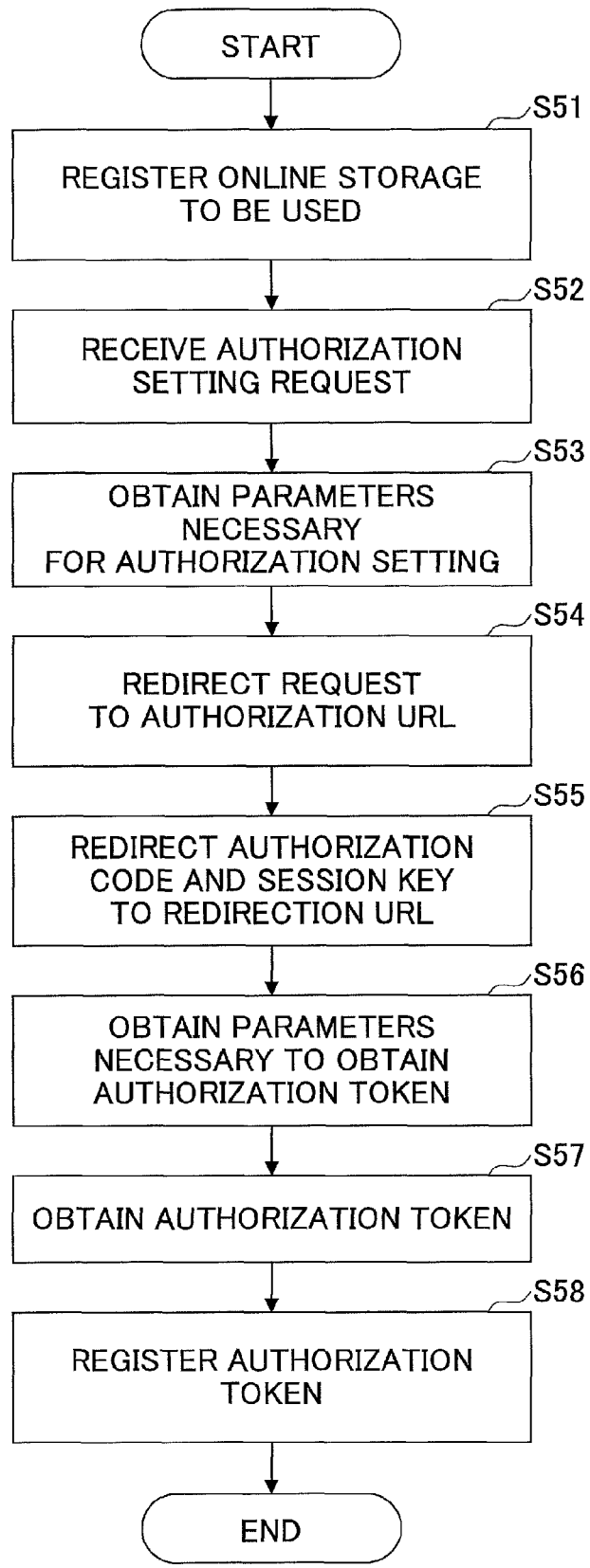
FIG. 15 is a flowchart illustrating an exemplary authorization setting process for an online storage.

FIG. 15 is a flowchart illustrating an exemplary authorization setting process for the online storage 32. A user such as an administrator operates the input unit 501 of the terminal 11 to enter a tenant ID, a user ID, and a password on the top screen of the portal site and request login. When a login request is received, the portal service application 61 allows the login, and then causes the display unit 502 of the terminal 11 to display an external service registration screen.

At step S51, the user selects a desired online storage (external service) 32 from an external service list displayed on the external service registration screen, and requests registration of the selected online storage 32. The external service list is stored in external service information in the management information storage 91.

When receiving a registration request, the portal service application 61 requests the registration unit 74 to register the online storage 32 selected by the user. The registration unit 74 registers the online storage 32 selected by the user in the tenant information stored in the management information storage 91 in association with the tenant ID of the logged-in user.

At step S52, on an authorization setting screen of the portal site, the user selects a user ID of a user to which authorization setting is to be applied, an external service ID (or a service name) of an external service for which authorization setting is performed, and a scope to be applied to the user; and requests authorization setting. The portal service application 61 receives an authorization setting request.

At step S53, the portal service application 61, which has received the authorization setting request, requests the authorization setting unit 75 to perform authorization setting. The authorization setting unit 75 obtains parameters necessary for the authorization setting from the external service information stored in the management information storage 91. The parameters necessary for the authorization setting include, in addition to the selected external service ID and the scope, a client ID and a redirection URL associated with the external service ID, and a session key for maintaining a session.

At step S54, the authorization setting unit 75 obtains an authorization URL associated with the selected external service ID from the external service information stored in the management information storage 91. The authorization setting unit 75 redirects a request including the parameters necessary for the authorization setting (i.e., a GET request including the parameters necessary for the authorization setting as query parameters) from the terminal 11 to the authorization URL.

As a result of redirecting the request from the terminal 11 to the authorization URL, the authorization setting is performed between the terminal 11 and the online storage 32. Here, after the authorization setting, because the terminal 11 is redirected from the online storage 32 to the authorization setting unit 75, an HTTP session is terminated. The session key is used to maintain the HTTP session.

The redirected online storage 32 causes the display unit 502 of the terminal 11 to display a login screen. The user operates the input unit 501 of the terminal 11 to enter an account and a password on the login screen and request login. When a login request is received, the online storage 32 performs a login process.

When the login has succeeded, the online storage 32 causes the display unit 502 of the terminal 11 to display an authorization screen. Then, the user confirms the authorization screen. The user operates the input unit 501 of the terminal 11 to press, for example, an authorization button displayed on the authorization screen, and thereby requests authorization. When receiving an authorization request, the online storage 32 performs registration of authorization.

At step S55, the online storage 32 redirects an authorization code indicating that authorization is granted and the session key from the terminal 11 to the redirection URL. The authentication setting unit 75 of the service providing system 2 receives the authorization code. When the user has already logged in when redirected to the online storage 32, displaying the login screen is omitted.

At step S56, after receiving the authorization code, the authorization setting unit 75 obtains parameters necessary to obtain an authorization token from the external service information stored in the management information storage 91. The parameters necessary to obtain an authorization token include, in addition to the received authorization code, a client ID and a client secret associated with the external service ID of the online storage 32 that has sent the authorization code.

At step S57, the authorization setting unit 75 sends the obtained client ID and client secret and the received authorization code to the online storage 32 to request an authorization token. The online storage 32 verifies the authorization code received from the authorization setting unit 75, and sends an authorization token to the authorization setting unit 75 of the service providing system 2.

At step S58, the authorization setting unit 75 receives the authorization token, and requests the registration unit 74 to register the authorization token. The registration unit 74 registers the authorization token in the user information stored in the management information storage 91 in association with the user (to which the authorization setting is applied) and the scope selected on the authorization setting screen. After the registration of the authorization token is completed, the authorization setting unit 75 reports the completion of registration to the portal service application 61. The portal service application 61 causes the display unit 502 of the terminal 11 to display a screen showing the result of the authorization setting.

The online storage 32 may be configured to send, together with the authorization token, a period of validity of the authorization token and a refresh token for reissuing an authorization token when the period of validity expires, to the service providing system 2.

Figure 16:
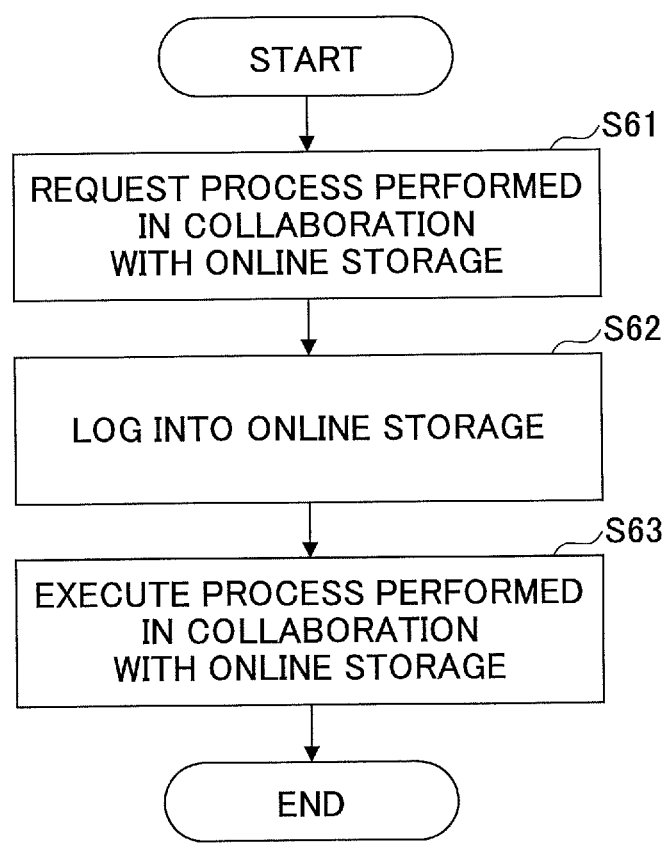
FIG. 16 is a flowchart illustrating an exemplary process performed in collaboration with an online storage.

FIG. 16 is a flowchart illustrating an exemplary process performed in collaboration with the online storage 32. At step S61, a user who is logged in the service providing system 2 requests a process to be performed in collaboration with the online storage 32, from the terminal 11 or the image forming apparatus 12.

When a process to be performed in collaboration with the online storage 32 is requested, at step S62, the external collaborative authentication unit 80 of the service providing system 2 performs a login process for logging into the online storage 32.

For example, the external collaborative authentication unit 80 receives a request to log into the online storage 32 from the data processing unit 84. The external collaborative authentication unit 80 obtains information necessary for the login process that is associated with the user who is logged in the service providing system 2 and the online storage 32 for which the login process is to be performed, from the user information stored in the management information storage unit 91. More specifically, the external collaborative authentication unit 80 obtains information for logging into the online storage 32 that is associated with the tenant ID, the login user ID, and the login password of the user who is logged in the service providing system 2.

For example, in the case of the user information of FIG. 6, when receiving a request to log into the online storage A, the external collaborative authentication unit 80 obtains the account and the password for logging into the online storage A.

On the other hand, when receiving a request to log into the online storage B in the user information of FIG. 6, the external collaborative authentication unit 80 obtains the account and the authorization token for logging into the online storage B.

When the online storage 32 that collaborates with the service providing system 2 is the online storage A for which authorization setting has not been made and which requires a login process, the external collaborative authentication unit 80 requests to log into the online storage A using the account and the password. The account and the password are an example of authentication information used to log into an external service. When receiving a login request including the account and the password, the online storage A performs authentication based on the account and the password. When the authentication has succeeded, the online storage A sends a response indicating that login is allowed to the external collaborative authentication unit 80. When the authentication has failed, the online storage A sends a response indicating that login is not allowed to the external collaborative authentication unit 80.

Once the external collaborative authentication unit 80 receives the response indicating that login is allowed from the online storage A, the service providing system 2 can upload (store) and download (obtain) data to and from the online storage A.

Thus, once the external collaborative authentication unit 80 receives the response indicating that login is allowed from the online storage 32, the service providing system 2 can perform, at step S63, a process in collaboration with the online storage 32.

When the online storage 32 that collaborates with the service providing system 2 is the online storage B for which authorization setting has been made, the external collaborative authentication unit 80 requests to log into the online storage B using the account and the authentication token. The account and the authentication token are an example of authorization information used to log into an external service. When receiving a login request including the account and the authorization token, the online storage B verifies the account and the authorization token. When the account and the authorization token have been successfully verified, the online storage B sends a response indicating that login is allowed to the external collaborative authentication unit 80. When the account and the authorization token have not been successfully verified, the online storage B sends a response indicating that login is not allowed to the external collaborative authentication unit 80.

Once the external collaborative authentication unit 80 receives the response indicating that login is allowed from the online storage B (32), the service providing system 2 can perform, at step S63, a process in collaboration with the online storage B (32) within a usage range defined by the scope.

<Process of Converting Electronic Data Received from External Service into Print Data and Printing Print Data>

In an exemplary process of the information processing system 1 of the present embodiment described below, electronic data (file) such as application data or image data stored in the online storage 32 is converted into print data, and the print data is printed on the image forming apparatus 12. A process performed by the terminal 11 to implement the process of converting electronic data stored in the online storage 32 into print data and printing the print data on the image forming apparatus 12 is described below.

The terminal 11 sends authentication information entered, for example, on a login screen to the service providing system 2, and thereby logs into the service providing system 2. The terminal 11 displays, for example, a print job entry screen to request the user to select electronic data (file) to be entered as a print job.

When the user selects electronic data stored in the terminal 11 and requests entry of a print job, the terminal 11 enters a print job by sending the selected electronic data to the service providing system 2.

Alternatively, the user can choose to select electronic data stored in the online storage 32 by, for example, pressing a "Select from External Storage" button on the print job entry screen. In this case, the terminal 11 requests a list of electronic data (which is hereafter referred to as a "user file list") stored in the online storage 32 in association with the user from the service providing system 2, and displays the user file list obtained from the service providing system 2. The user can select electronic data from the displayed user file list and request entry of a print job.

When the user selects electronic data from the user file list and requests entry of a print job, the terminal 11 enters a print job by specifying the selected electronic data.

When multiple online storages 32 are available, the terminal 11 may obtain user file lists from the online storages 32, merge the obtained user file lists, and display the merged user file list. Alternatively, the terminal 11 may be configured to request the user to select an online storage 32 from the online storages 32, and display a user file list obtained from the selected online storage 32.

Figure 17:
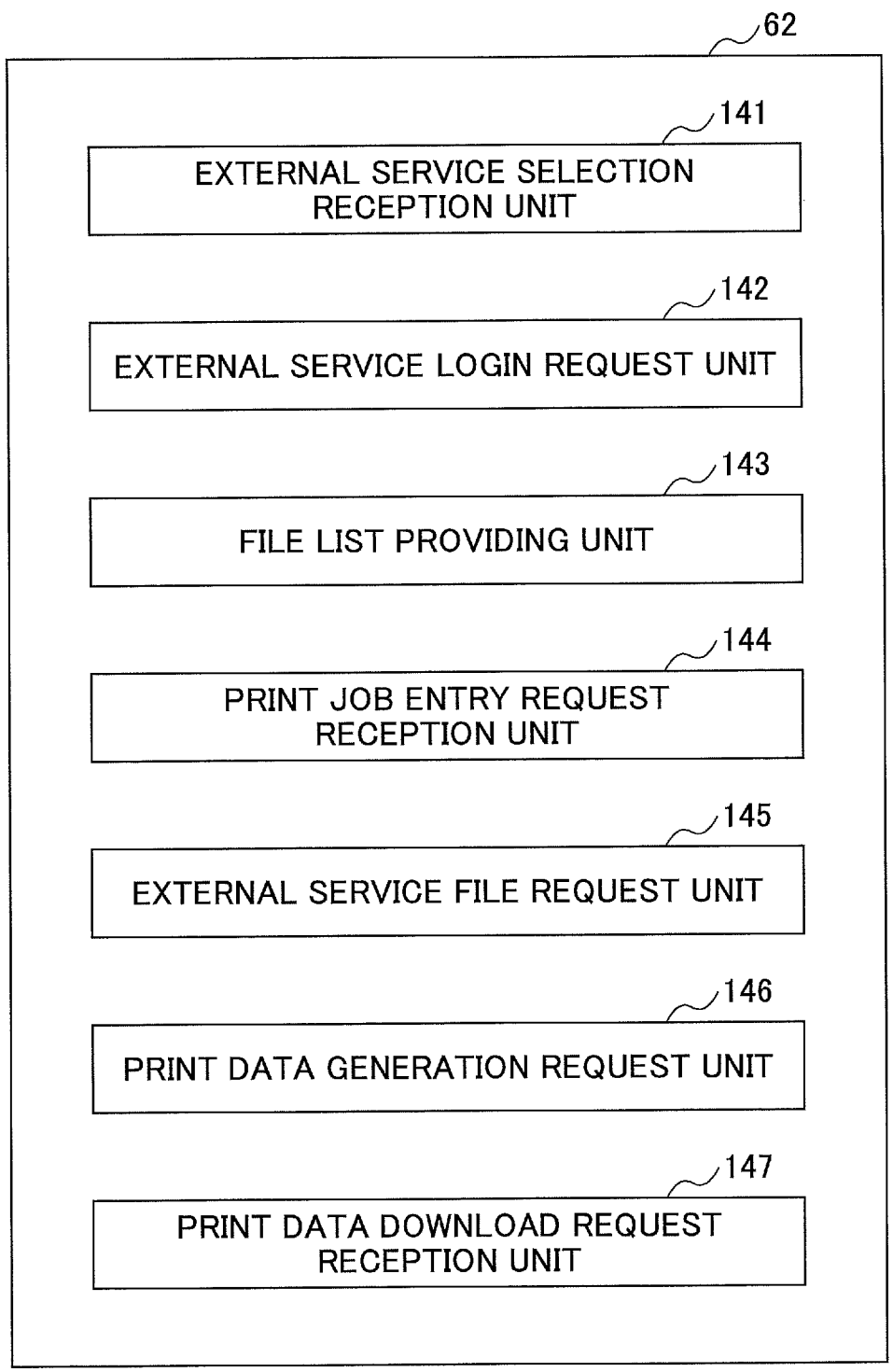
FIG. 17 is a drawing illustrating an exemplary configuration of a print service application.

In the information processing system 1 of the present embodiment, to implement the process of converting electronic data stored in the online storage 32 into print data and printing the print data on the image forming apparatus 12, the print service application 62 may be configured as illustrated by FIG. 17.

FIG. 17 is a drawing illustrating an exemplary configuration of the print service application 62. The print service application 62 may include an external service selection reception unit 141, an external service login request unit 142, a file list providing unit 143, a print job entry request reception unit 144, an external service file request unit 145, a print data generation request unit 146, and a print data download request reception unit 147. FIG. 17 illustrates functional units (or processing blocks) of the print service application that are necessary to describe the process of converting electronic data stored in the online storage 32 into print data and printing the print data on the image forming apparatus 12.

The external service selection reception unit 141 receives, from the terminal 11, a request to select electronic data stored in the online storage 32. The external service login request unit 142 requests the external collaborative authentication unit 80 of the platform 52 to log into the online storage 32 using an online storage account and an online storage password that correspond to a user who is logged in the service providing system 2.

The file list providing unit 143 obtains a user file list from the online storage 32, and provides the user file list to the terminal 11. The print job entry request reception unit 144 receives a print job entry request from the terminal 11.

Based on the print job entry request from the terminal 11, the external service file request unit 145 specifies electronic data selected by the user, and requests the data processing control unit 81 of the platform 52 to obtain the electronic data from the online storage 32. The data processing control unit 81 obtains the electronic data selected by the user from the online storage 32 by using the processing queue 82, the data processing requesting unit 83, and the data processing unit 84 for obtaining electronic data from the online storage 32.

The print data generation request unit 146 requests the data processing control unit 81 of the platform 52 to perform a process of generating print data from electronic data based on the print job entry request from the terminal 11.

The data processing control unit 81 converts the electronic data selected by the user into print data by using the processing queue 82, the data processing requesting unit 83, and the data processing unit 84 for converting electronic data into print data. The print data download request reception unit 147 receives a print data download request from the image forming apparatus 12, and sends print data to the image forming apparatus 12.

The above configuration enables a user to print electronic data stored in the online storage 32 on the image forming apparatus 12.

Figure 18:
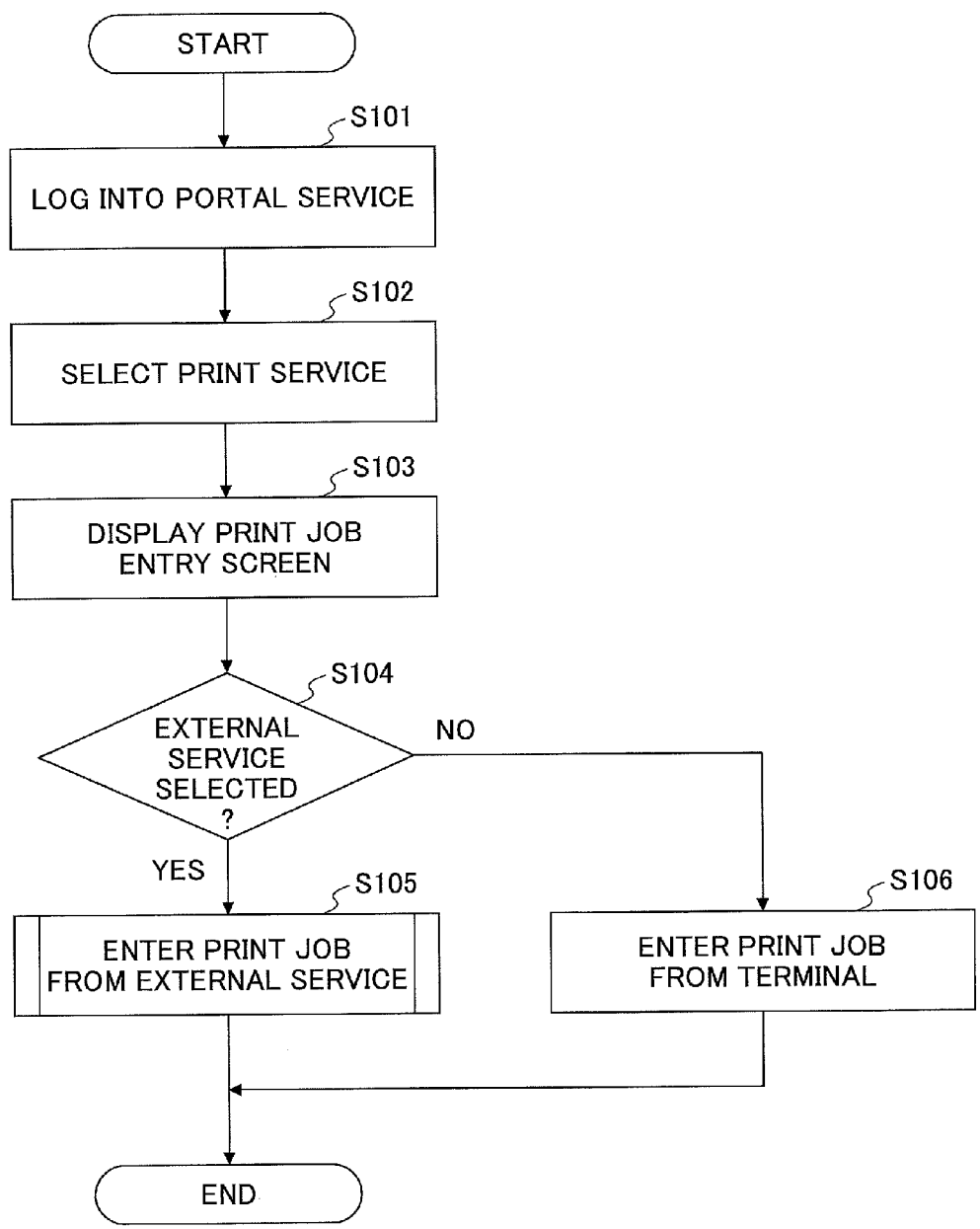
FIG. 18 is a flowchart illustrating an exemplary process of converting electronic data into print data and printing print data on an image forming apparatus.

FIG. 18 is a flowchart illustrating an exemplary process of converting electronic data stored in the online storage 32 into print data and printing the print data on the image forming apparatus 12.

At step S101, a user who intends to use a print service provided by the service providing system 2 operates the input unit 501 of the terminal 11 to cause the terminal 11 to access a portal site of the service providing system 2. Based on the operation performed by the user, the terminal 11 accesses the portal site of the service providing system 2.

When the access to the portal site from the terminal 11 is detected, the access control unit 72 of the service providing system 2 allows the terminal 11 to access the portal service application 61. The user operates the input unit 501 of the terminal 11 to request login on a login screen. After logging into the portal service application 61, the user can access the print service application 62.

At step S102, the user operates the input unit 501 of the terminal 11 to cause the terminal 11 to select a print service of the service providing system 2. Based on the operation performed by the user, the terminal 11 accesses the print service application 62 of the service providing system 2.

At step S103, the terminal 11 displays, for example, a print job entry screen to request the user to select electronic data to be entered as a print job. On the print job entry screen, the user can select electronic data stored in the terminal 11 or electronic data stored in the online storage 32 that is to be entered as a print job.

For example, the user chooses to select electronic data stored in the online storage 32 by, for example, pressing a "Select from External Storage" button on the print job entry screen. When the user chooses to select electronic data stored in the online storage 32 (YES at step S104), the terminal 11 and the service providing system 2 collaborate with each other to perform a process of entering a print job from an external service at step S105. Details of step S105 are described later.

On the other hand, when the user selects electronic data stored in the terminal 11 on the print job entry screen (NO at step S104), the terminal 11 performs step S106. At step S106, the terminal 11 sends the electronic data selected by the user to the service providing system 2 to enter a print job from the terminal 11.

Figure 19:
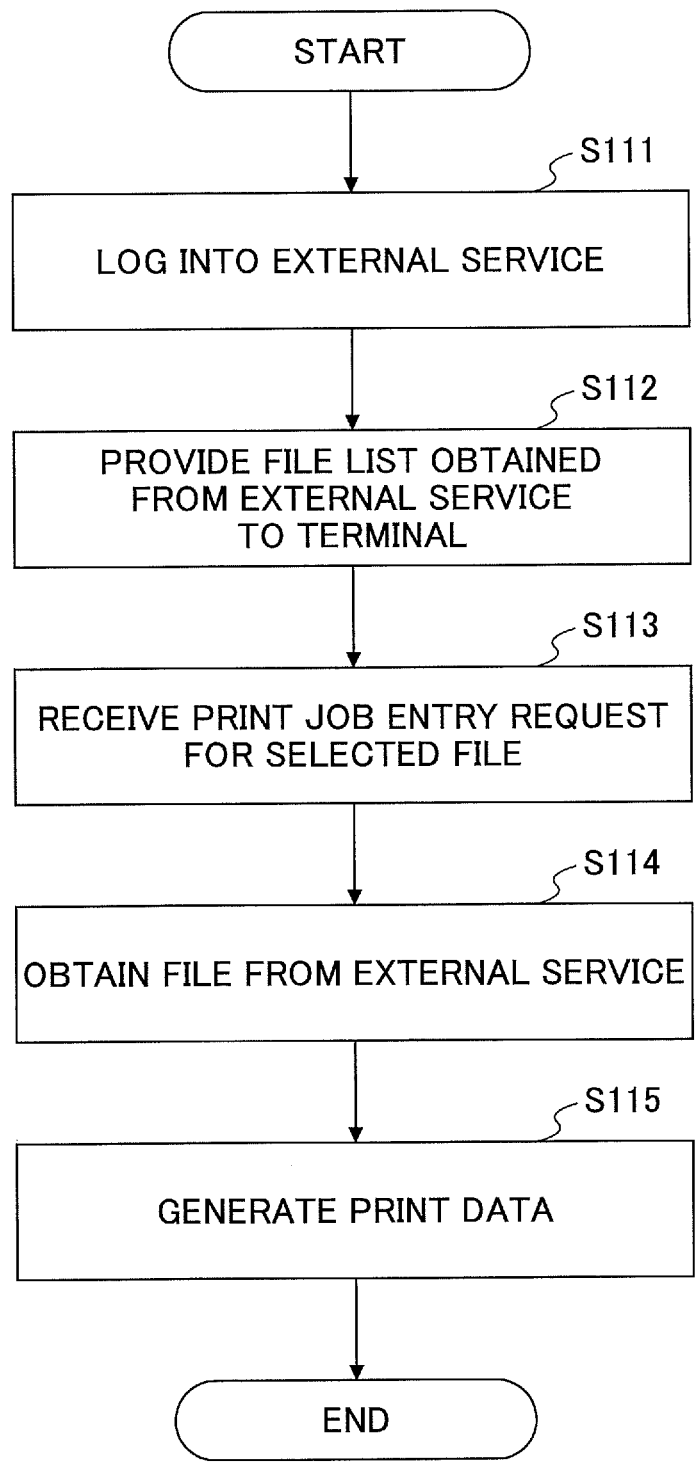
FIG. 19 is a flowchart illustrating an exemplary process of entering a print job from an external service.

FIG. 19 is a flowchart illustrating an exemplary process of entering a print job from an external service performed at step S105 of FIG. 18.

At step S111, the external service selection reception unit 141 of the print service application 62 receives, from the terminal 11, a request to select electronic data stored in the online storage 32 (or selection of the online storage 32 from which electronic data is to be obtained). The external service login request unit 142 requests the external collaborative authentication unit 80 of the platform 52 to log into the online storage 32 using an online storage account and an online storage password that correspond to a user who is logged in the service providing system 2. The external collaborative authentication unit 80 performs a login process to log into the online storage 32 using an online storage account and an online storage password that correspond to the logged-in user.

At step S112, the file list providing unit 143 of the print service application 62 obtains a user file list from the online storage 32, and provides the user file list to the terminal 11. The user can select electronic data from the user file list displayed on the terminal 11 and request entry of a print job. When the user selects electronic data from the user file list and requests entry of a print job, the terminal 11 enters a print job by specifying the selected electronic data.

At step S113, the print job entry request reception unit 144 receives a print job entry request from the terminal 11. At step S114, based on the print job entry request received from the terminal 11, the external service file request unit 145 requests the data processing control unit 81 of the platform 52 to obtain the selected electronic data from the online storage 32. The data processing control unit 81 obtains the electronic data selected by the user from the online storage 32 by using the processing queue 82, the data processing requesting unit 83, and the data processing unit 84 for obtaining electronic data from the online storage 32.

At step S115, the print data generation request unit 146 requests the data processing control unit 81 of the platform 52 to perform a process of generating print data from the electronic data obtained from the online storage 32. The data processing control unit 81 converts the electronic data obtained from the online storage 32 into print data by using the processing queue 82, the data processing requesting unit 83, and the data processing unit 84 for converting electronic data into print data.

The generated print data is temporarily stored in the service providing system 2 until a print data download request is received from the image forming apparatus 12. When a print data download request is received from the image forming apparatus 12, the print data download request reception unit 147 sends the print data to the image forming apparatus 12.

The above configuration enables a user being managed by the service providing system 2 to print electronic data stored in the online storage 32 on the image forming apparatus 12 through collaboration between the service providing system 2 and the online storage 32.

In the above embodiment, the print service application 62 requests the data processing control unit 81 of the platform 52 to obtain electronic data from the online storage 32. However, the print service application 62 may be configured to obtain electronic data directly from the online storage 32. Also in the above embodiment, electronic data stored in the online storage 32 is converted into print data to be printed on the image forming apparatus 12. However, this disclosure may also be applied to other types of data processing. For example, this disclosure may be applied to a process of converting electronic data stored in an external service into data with a data format that can be output from an output apparatus such as a projector or an electronic blackboard.

<Summary>

The information processing system 1 of the present embodiment can properly manage services to be provided, users who use the services, and apparatuses that use the services, and makes it possible to convert electronic data stored in an external service into output data and output the output data from an output apparatus.

A service providing system and a data providing method according to embodiments of the present invention are described above. However, the present invention is not limited to the specifically disclosed embodiments, and variations and modifications may be made without departing from the scope of the present invention. The terminal 11 and the image forming apparatus 12 are examples of a service receiving apparatus.

The management information storage 91 is an example of a management information storage. The portal service application 61 is an example of an authentication information receiving unit. The user authentication unit 77 and the user device authentication unit 78 are examples of an authentication unit. The external service file request unit 145 is an example of a data requesting unit. The data processing control unit 81, the processing queue 82, the data processing requesting unit 83, and the data processing unit 84 are, collectively, an example of an obtaining unit. The print data generation request unit 146 is an example of a conversion request unit.

The data processing control unit 81, the processing queue 82, the data processing requesting unit 83, and the data processing unit 84 are, collectively, an example of a conversion unit. The print data download request reception unit 147 is an example of an output data providing unit. The external service selection reception unit 141 is an example of an external service selection reception unit. The external service login request unit 142 and the external collaborative authentication unit 80 are examples of an external collaborative authentication unit. The file list providing unit 143 is an example of a data list providing unit.

An aspect of this disclosure provides a service providing system and a data providing method that can control the provision of a service for converting electronic data received from an external service into output data and outputting the output data, depending on recipients of the service.

What is claimed is:

1. A system implemented by one or more information processing apparatuses and providing a service to a service receiving apparatus connected via a network to the system, the system comprising:
  a management information storage that stores a program and management information, said management information including service identification information of the service, user authentication information of a user using the service, and device authentication information of the service receiving apparatus that are associated with each other, and
  at least one processor that executes the program so as to cause the system to perform the steps including;
    receiving, as authentication information, at least one of the user authentication information used for user authentication and the device authentication information used for device authentication from the service receiving apparatus;
    performing authentication by referring to the management information storage based on the received authentication information;
    making an acquisition request to obtain process target data based on an entry request from the service receiving apparatus that has been successfully authenticated;
    obtaining the process target data from one of a plurality of external services based on the acquisition request;
    making a conversion request to convert the obtained process target data into output data with a data format that the service receiving apparatus is able to output;
    converting the obtained process target data into the output data based on the conversion request;
    providing the output data to the service receiving apparatus,
    receiving, from the service receiving apparatus that has been successfully authenticated, selection of an external service among the plurality of external services from which the process target data is to be obtained;

connecting the system to the selected external service using external service authentication information of the selected external service, said external service authentication information including a scope of authorized use of the external service, the management information storage being configured to store the external service authentication information so as to associate with each of a plurality of users and each of the plurality of external services;

obtaining a list of process target data within the scope of the authorized use from the external service to which the system is connected, and providing the list of process target data to the service receiving apparatus, and entering the process target data from the selected external service when the one of the plurality of external services is selected by the service receiving apparatus, and entering the process target data from the service receiving apparatus when none of the plurality of external services is selected by the service receiving apparatus.

2. The system as claimed in claim 1, wherein the obtaining the list of process target data obtains, from the external service, the list of process target data that is stored in the external service in association with the user who has been successfully authenticated.

3. The system as claimed in claim 1, wherein the obtaining the list of process target data obtains, from the plurality of external services, lists of process target data stored in association with the user who has been successfully authenticated, merges the lists of process target data into a merged list of process target data, and provides the merged list of process target data to the service receiving apparatus.

4. The system as claimed in claim 1, wherein the obtaining the list of process target data obtains the list of process target data stored in association with the user who has been successfully authenticated from one of the plurality of external services that is selected by the user, and provides the list of process target data to the service receiving apparatus.

5. The system as claimed in claim 1, wherein the providing provides the output data to the service receiving apparatus that is different from the service receiving apparatus that has made the entry request.

6. A system implemented by one or more information processing apparatuses and providing a service to a service receiving apparatus connected via a network to the system, the system comprising:

a management information storage that stores a program and management information, said management information including service identification information of the service, user authentication information of a user using the service, and device authentication information of the service receiving apparatus that are associated with each other; and at least one processor that executes the program so as to cause the system to perform the steps including:

receiving, as authentication information, at least one of the user authentication information used for user authentication and the device authentication information used for device authentication from the service receiving apparatus;

performing authentication by referring to the management information storage based on the received authentication information;

obtaining process target data from one of a plurality of external services based on an entry request from the service receiving apparatus that has been successfully authenticated;

converting the obtained process target data into output data with a data format that the service receiving apparatus is able to output, receiving, from the service receiving apparatus that has been successfully authenticated, selection of an external service among the plurality of external services from which the process target data is to be obtained;

connecting the system to the selected external service using external service authentication information of the selected external service, said external service authentication information including a scope of authorized use of the external service, the management information storage being configured to store the external service authentication information so as to associate with each of a plurality of users and each of the plurality of external services;

obtaining a list of process target data within the scope of the authorized use from the external service to which the system is connected, and providing the list of process target data to the service receiving apparatus, and entering the process target data from the selected external service when the one of the plurality of external services is selected by the service receiving apparatus, and entering the process target data from the service receiving apparatus when none of the plurality of external services is selected by the service receiving apparatus.

7. A method performed by a system implemented by one or more information processing apparatuses and providing a service to a service receiving apparatus connected via a network to the system, the method comprising:

storing, in a management information storage, management information, said management information including service identification information of the service, user authentication information of a user using the service, and device authentication information of the service receiving apparatus that are associated with each other;

receiving, as authentication information, at least one of the user authentication information used for user authentication and the device authentication information used for device authentication from the service receiving apparatus;

performing authentication by referring to the management information storage based on the received authentication information;

making an acquisition request to obtain process target data based on an entry request from the service receiving apparatus that has been successfully authenticated;

obtaining the process target data from one of a plurality of external services based on the acquisition request;

making a conversion request to convert the obtained process target data into output data with a data format that the service receiving apparatus is able to output;

converting the obtained process target data into the output data based on the conversion request;

providing the output data to the service receiving apparatus, receiving, from the service receiving apparatus that has been successfully authenticated, selection of an external service among the plurality of external services from which the process target data is to be obtained;

connecting the system to the selected external service using external service authentication information of the selected external service, said external service authentication information including a scope of authorized use of the external service, the management information storage being configured to store the external service authentication information so as to associate with each of a plurality of users and each of the plurality of external services;

obtaining a list of process target data within the scope of the authorized use from the external service to which the system is connected, and providing the list of process target data to the service receiving apparatus, and entering the process target data from the selected external service when the one of the plurality of external services is selected by the service receiving apparatus, and entering the process target data from the service receiving apparatus when none of the plurality of external services is selected by the service receiving apparatus.

8. The system as claimed in claim 1, wherein the steps further includes determining whether the one of the plurality of external services is selected as a source of the process target data based on the acquisition request.

9. The system as claimed in claim 1, wherein the external service authentication information includes a URL of an authorization server of the external service and a URL of the system to which the user is redirected from the external service.

* * * * *